No. 710,772. Patented Oct. 7, 1902.
H. E. GOLDBERG.
CALCULATING MACHINE.
(Application filed Feb. 24, 1902.)
(No Model.) 13 Sheets—Sheet I.
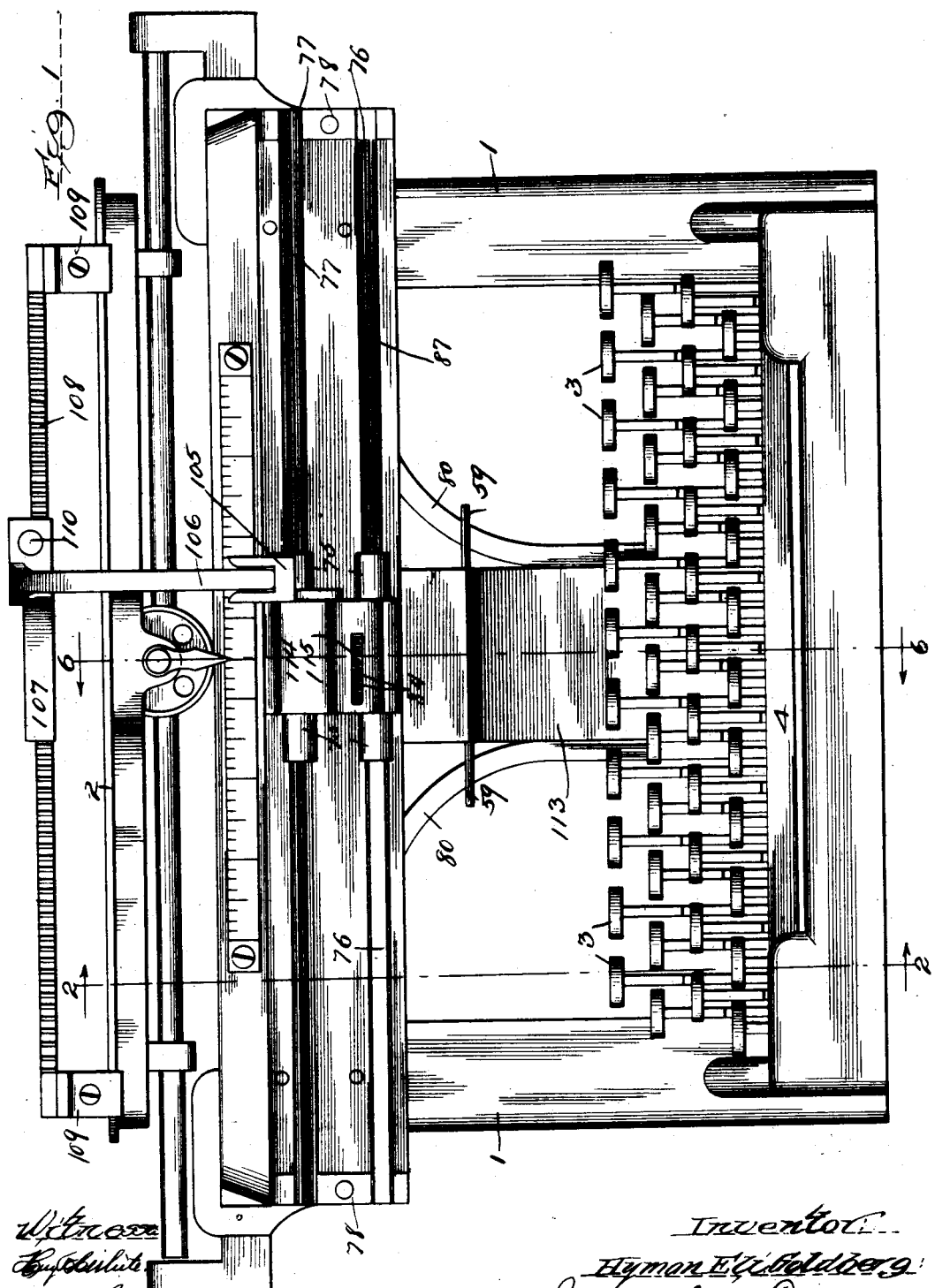

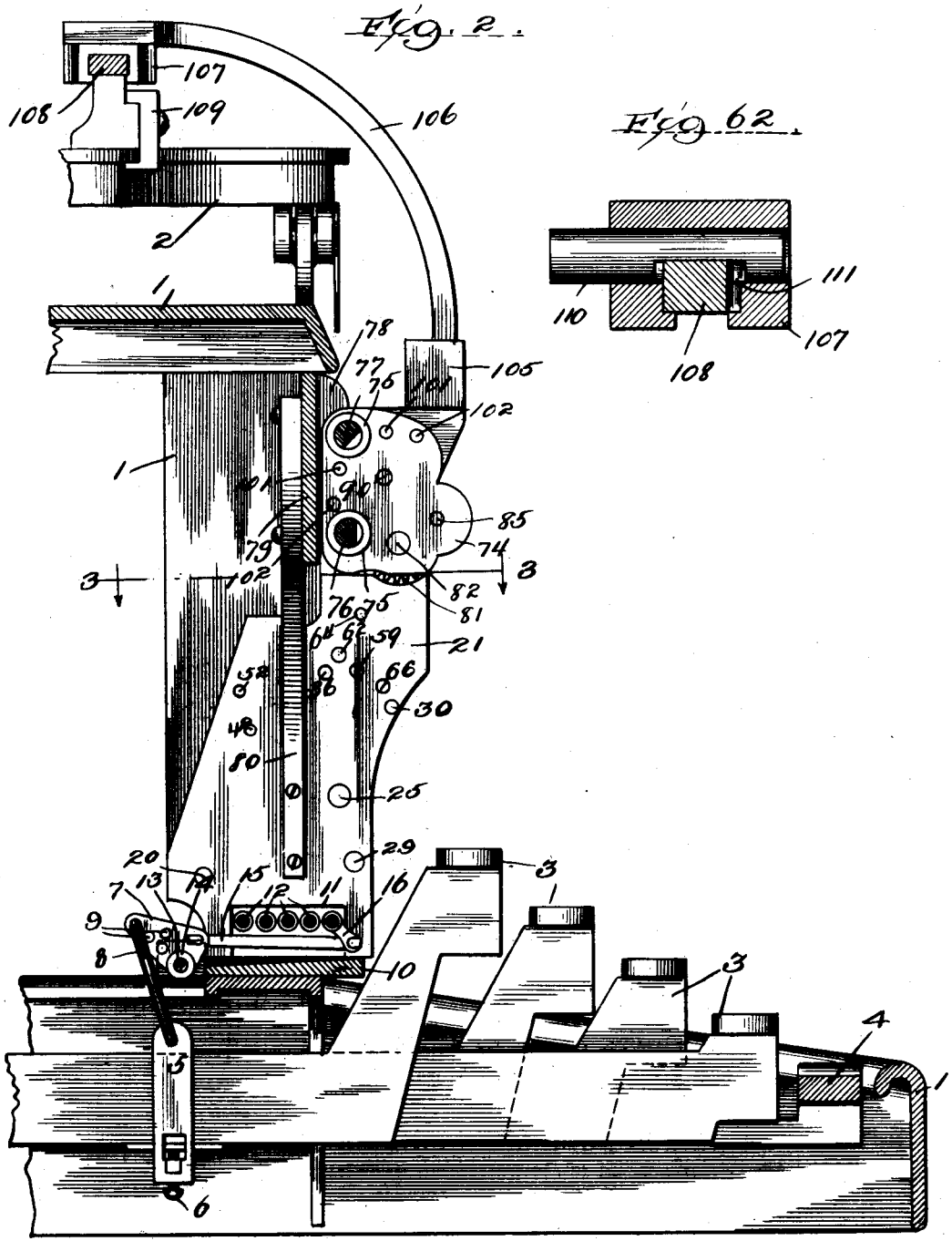

No. 710,772. Patented Oct. 7, 1902.
H. E. GOLDBERG.
CALCULATING MACHINE.
(Application filed Feb. 24, 1902.)
(No Model.) 13 Sheets—Sheet 3.
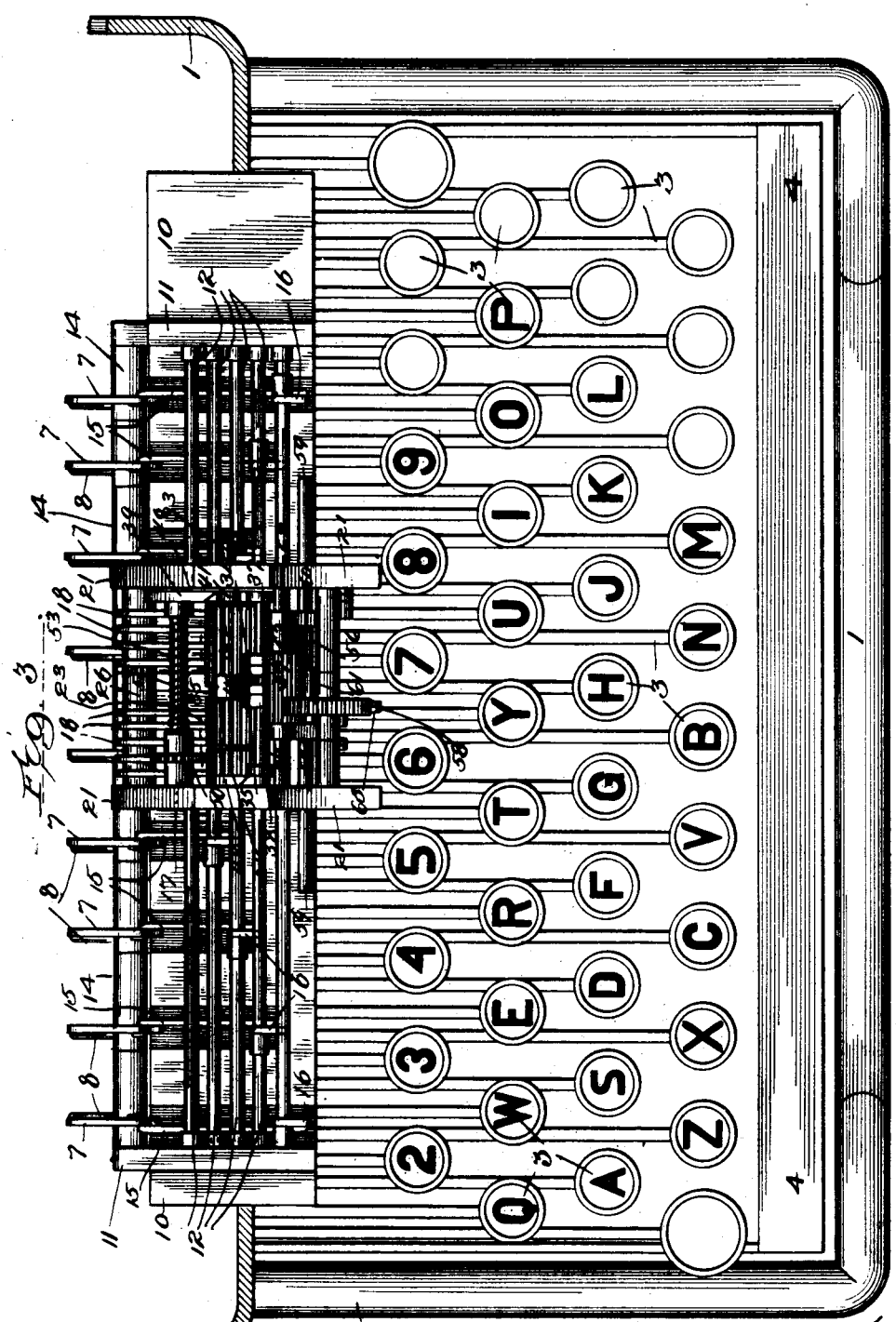

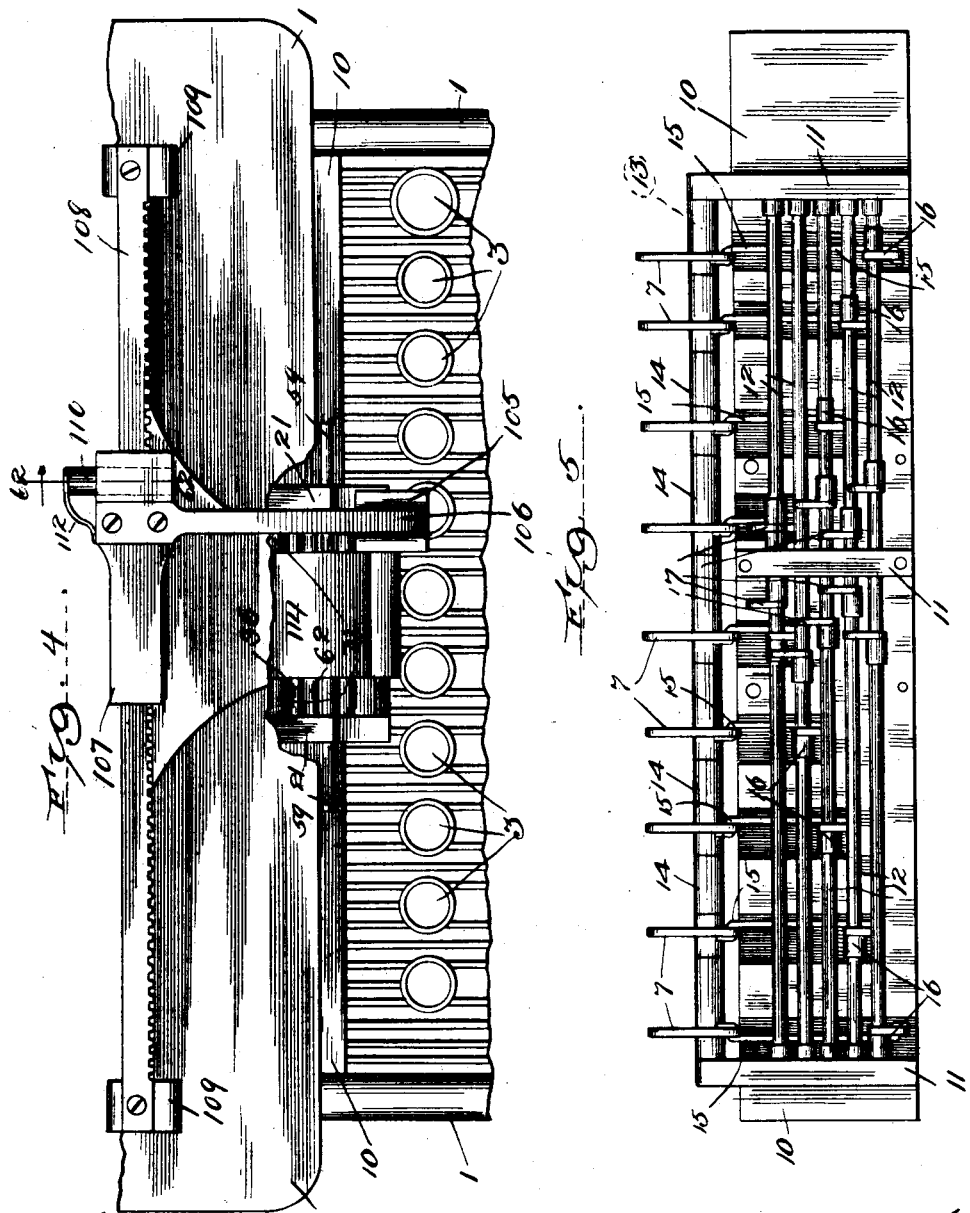

No. 710,772. Patented Oct. 7, 1902.
H. E. GOLDBERG.
CALCULATING MACHINE.
(Application filed Feb. 24, 1902.)
(No Model.) 13 Sheets—Sheet 5.
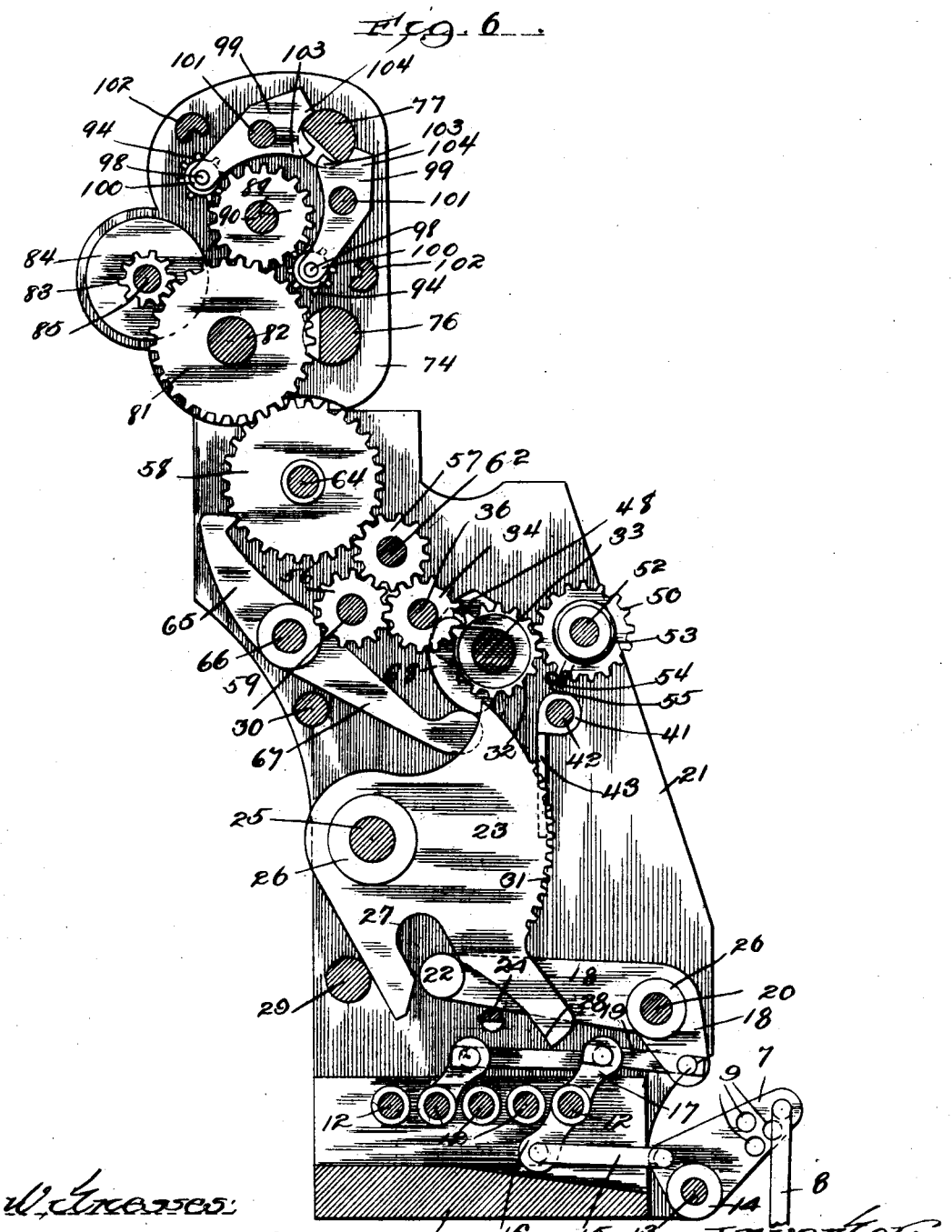

No. 710,772. Patented Oct. 7, 1902.
H. E. GOLDBERG.
CALCULATING MACHINE.
(Application filed Feb. 24, 1902.)
(No Model.) 13 Sheets—Sheet 6.
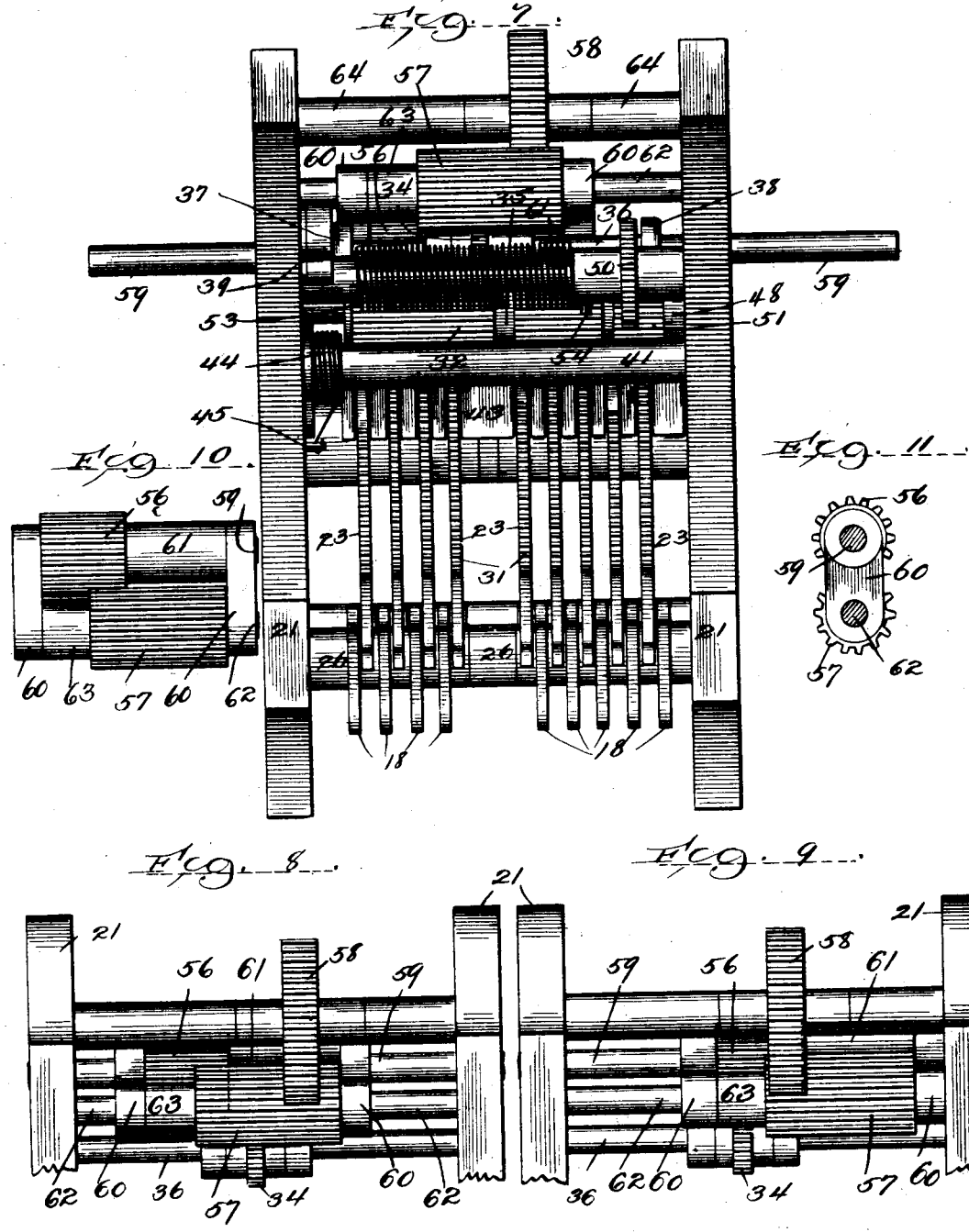

No. 710,772. Patented Oct. 7, 1902.
H. E. GOLDBERG.
CALCULATING MACHINE.
(Application filed Feb. 24, 1902.)
(No Model.) 13 Sheets—Sheet 7.
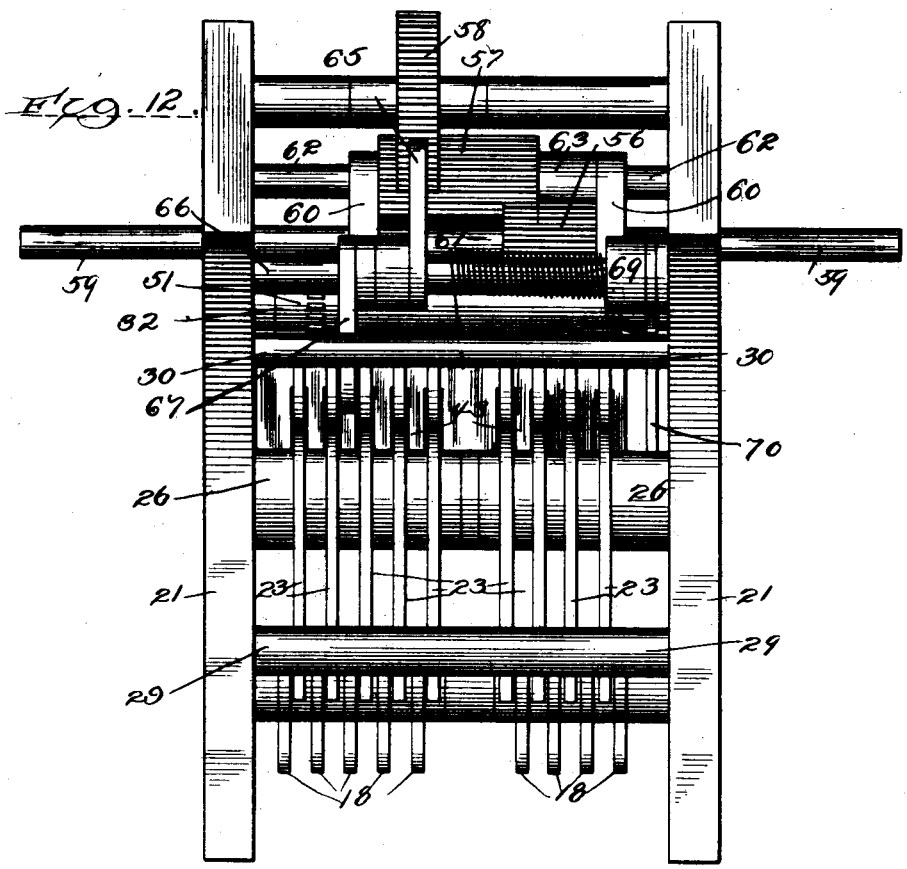
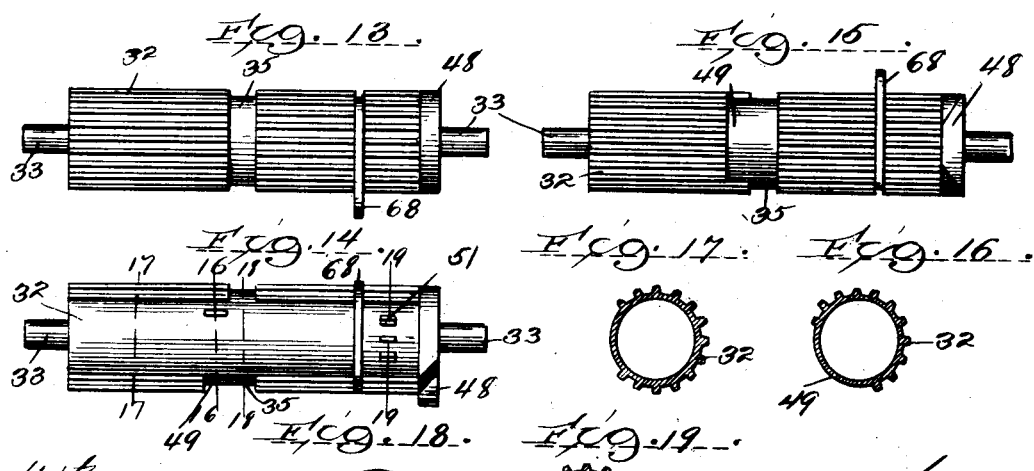

No. 710,772. Patented Oct. 7, 1902.
H. E. GOLDBERG.
CALCULATING MACHINE.
(Application filed Feb. 24, 1902.)
(No Model.) 13 Sheets—Sheet 8.
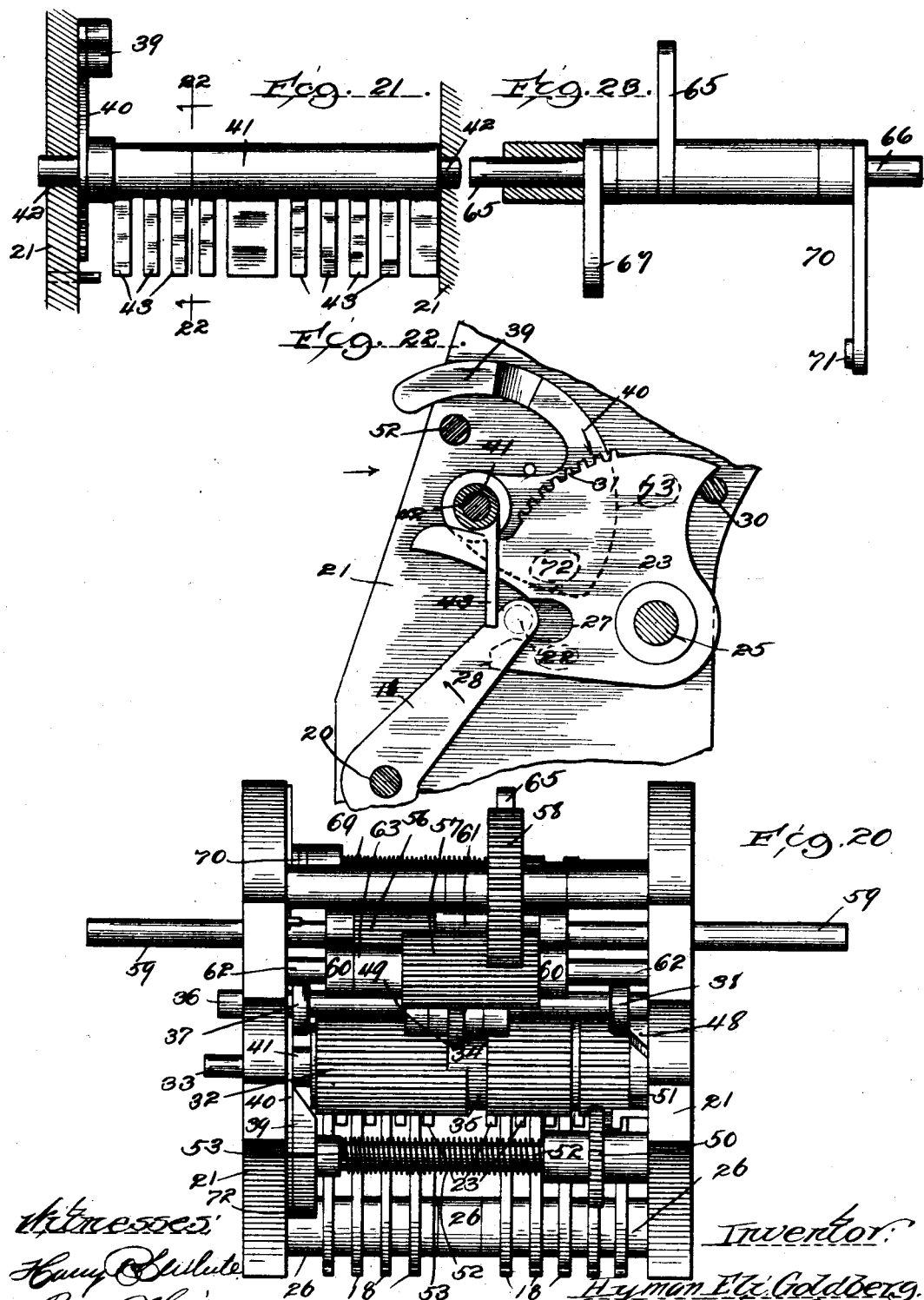

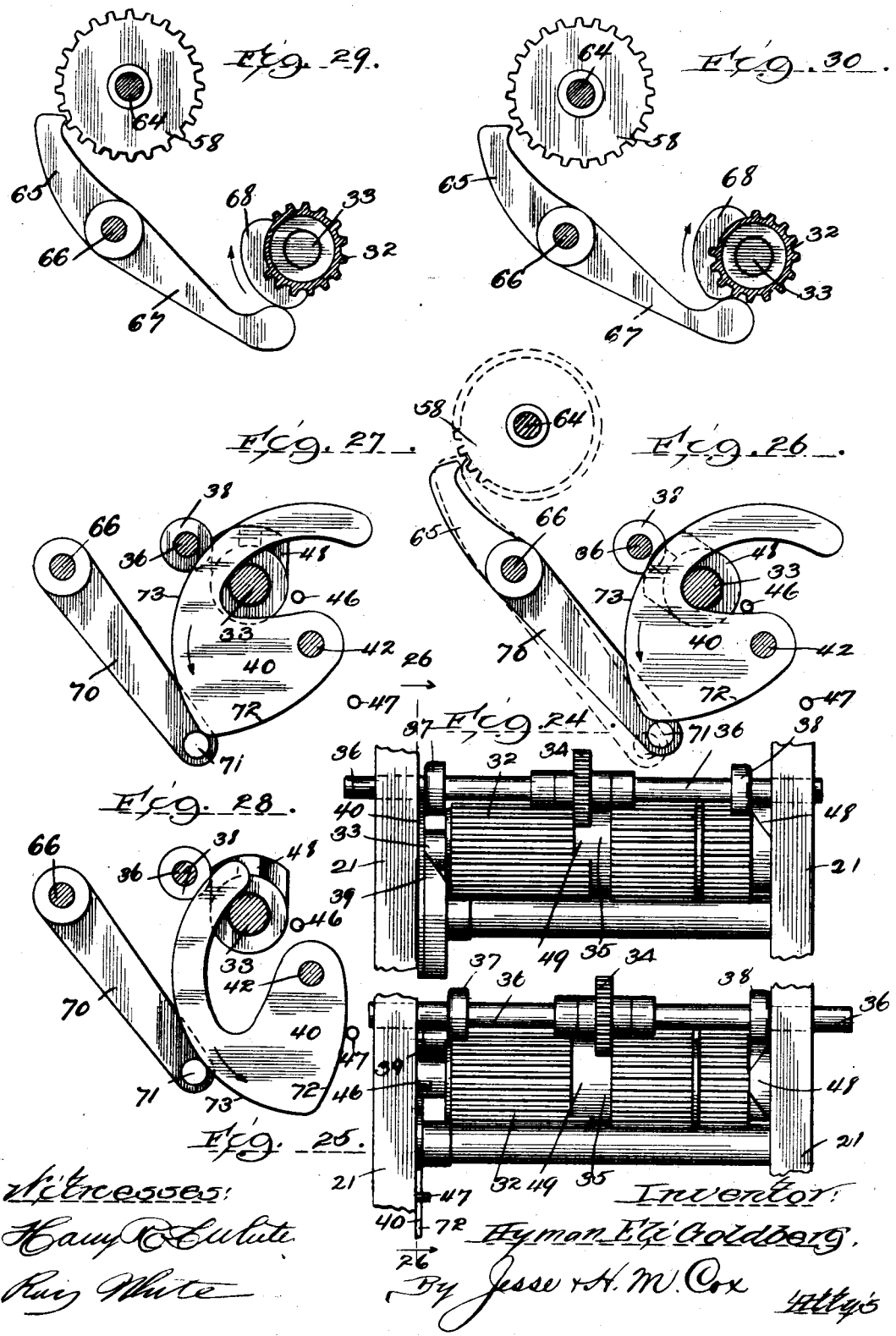

No. 710,772. Patented Oct. 7, 1902.
H. E. GOLDBERG.
CALCULATING MACHINE.
(Application filed Feb. 24, 1902.)
(No Model.) 13 Sheets—Sheet 10.
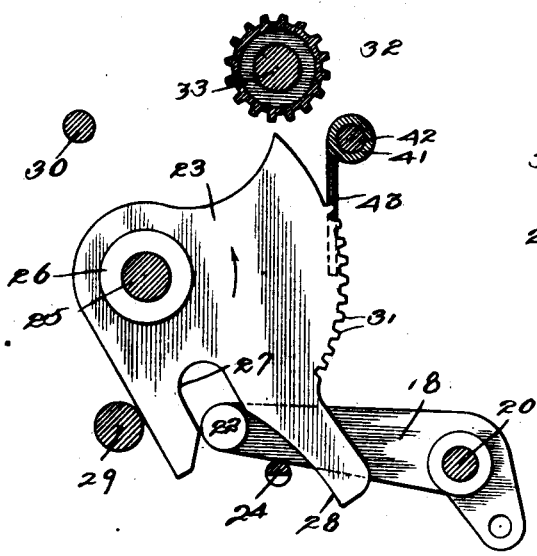
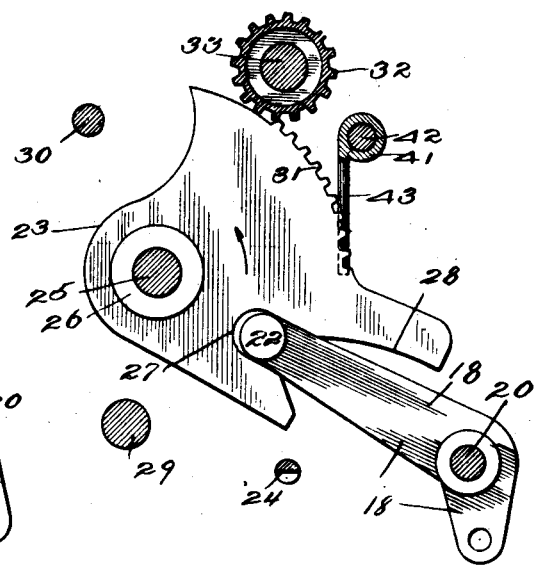
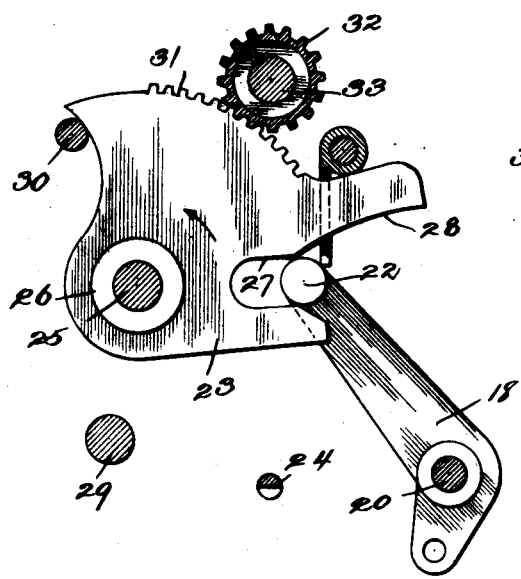
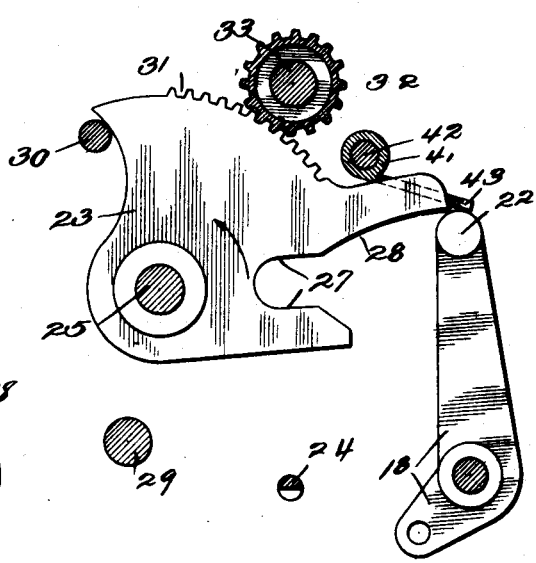

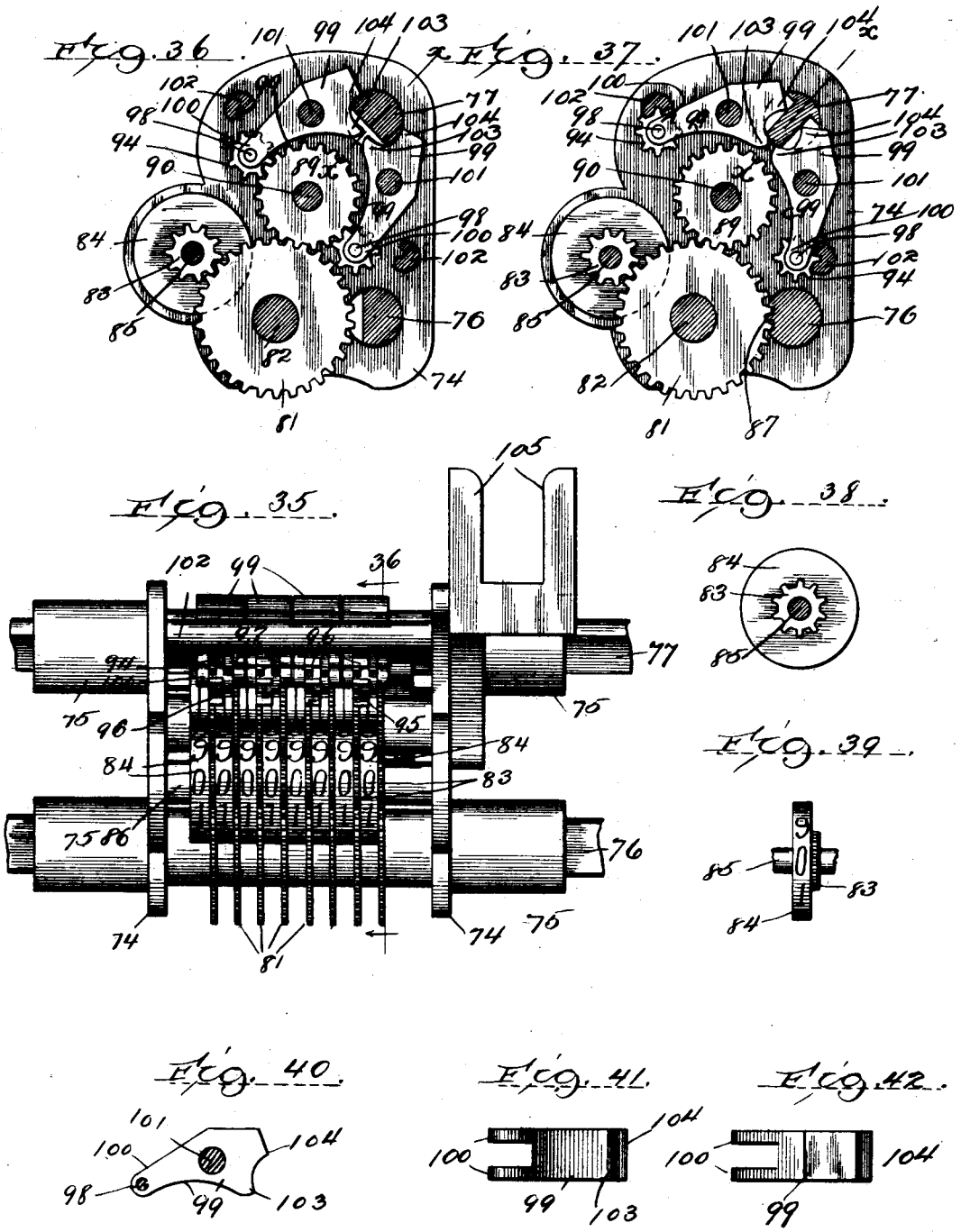

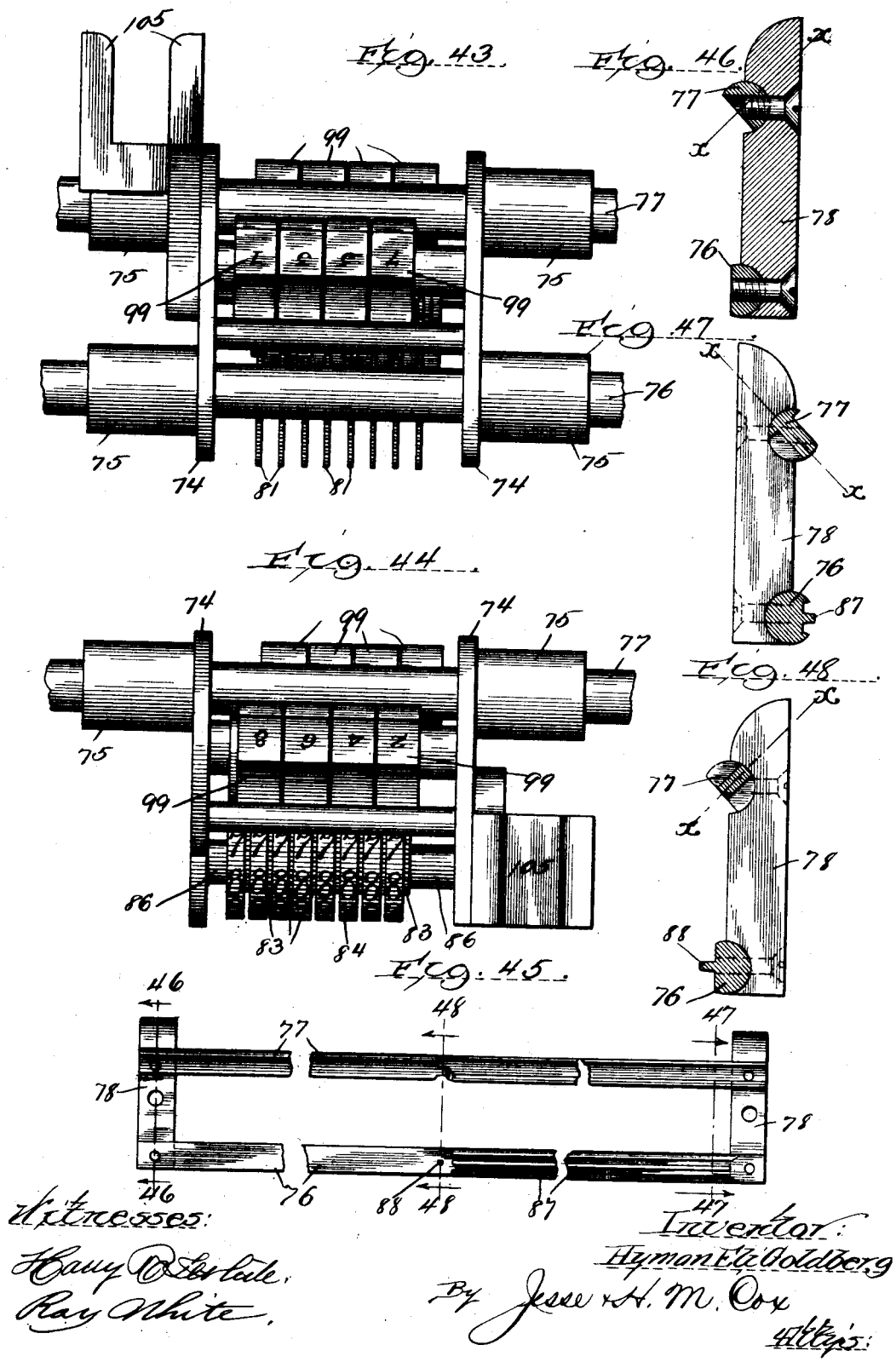

No. 710,772. Patented Oct. 7, 1902.
H. E. GOLDBERG.
CALCULATING MACHINE.
(Application filed Feb. 24, 1902.)

(No Model.) 13 Sheets—Sheet 13.

Witnesses
Harry L. White
Ray White

Inventor
Hyman E. Goldberg
Jesse & H. M. Cox
Attys.

UNITED STATES PATENT OFFICE.

HYMAN ELI GOLDBERG, OF CHICAGO, ILLINOIS.

CALCULATING-MACHINE.

SPECIFICATION forming part of Letters Patent No. 710,772, dated October 7, 1902.

Application filed February 24, 1902. Serial No. 95,342. (No model.)

*To all whom it may concern:*

Be it known that I, HYMAN ELI GOLDBERG, a citizen of the United States, residing in the city of Chicago, county of Cook, State of Illinois, have invented a new and useful Improvement in Calculating-Machines, of which the following is a specification.

My invention relates to calculating-machines, and has for its object the production of a machine which shall be simple and durable in construction, easily operated, and positive in its action. To this end I have produced certain mechanical contrivances and combinations of elements which are particularly pointed out in the claims hereof and which are illustrated in the accompanying drawings.

My present machine is shown in the form of an attachment to type-writers; but it is evident that by independently supplying the requisite parts my machine may exist as a complete and independent calculating-machine.

Certain parts of the mechanism herein shown are shown and claimed in an application for Letters Patent of the United States filed by me September 26, 1901, Serial No. 76,680.

Figure 49:
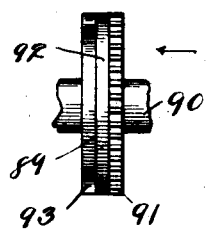
Figure 50:
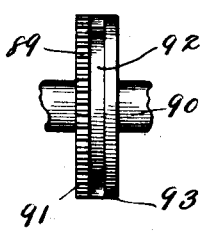
Figure 51:
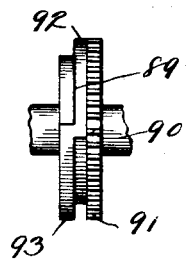
Figure 52:
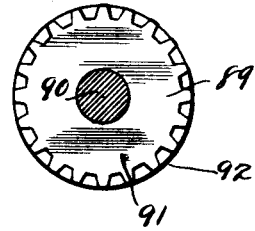
Figure 54:
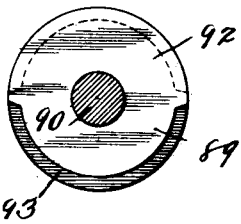
Figure 53:
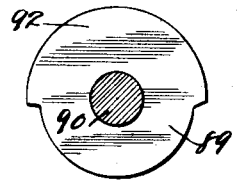
Figure 55:
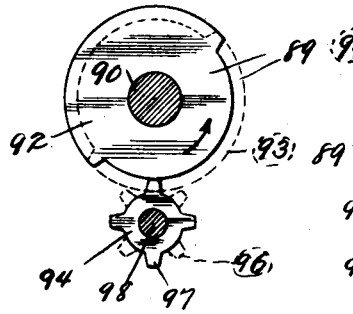
Figure 56:
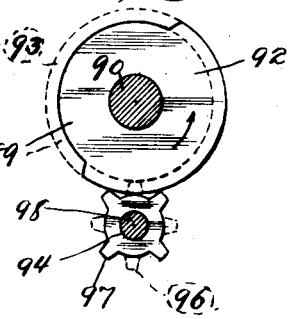
Figure 59:
Figure 58:
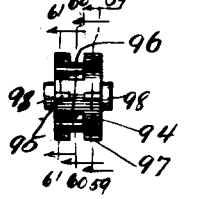
Figure 60:
Figure 57:
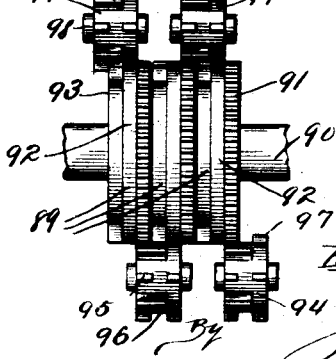
Figure 61:
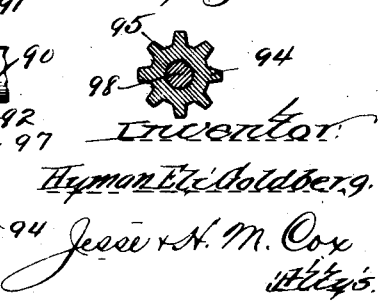

In the accompanying drawings, Figure 1 is a general front view of my machine inclosed within the outer casings thereof and shown in position upon a type-writer. Fig. 2 is a general sectional view looking in the direction of the arrows on the line 2 2, Fig. 1. Fig. 3 is a sectional view in plan, taken on the line 3 3, Fig. 2, with the outer casings removed. Fig. 4 is a fragmentary plan view indicating my machine attached in position upon the type-writer. Fig. 5 is a plan view of the rock-shafts and connected parts of the concentrating mechanism. Fig. 6 is a sectional view showing the relative positions of the mechanism looking in the direction of the arrows on the line 6 6, Fig. 1. Fig. 7 is a rear view of the setting and reversing mechanism. Figs. 8 and 9 are front views of the reversing mechanism in its two different positions. Figs. 10 and 11 are side and end views, respectively, of the sliding parts of the reversing mechanism. Fig. 12 is a front view of the mechanism shown in Fig. 7. Figs. 13, 14, and 15 are side views of the universal gear which forms a part of the setting mechanism. Figs. 16, 17, 18, and 19 are sectional views taken, respectively, on the lines 16 16, 17 17, 18 18, and 19 19, Fig. 14. Fig. 20 is a top view from the rear of the mechanism shown in Figs. 7 and 12. Fig. 21 is a rear view of the unmeshing-bar. Fig. 22 is a side view in section on the line 22 22, Fig. 21, showing the operation of the unmeshing-cam. Fig. 23 is a rear view of the locking-lever which operates upon the setting-wheel. Figs. 24 and 25 are two top views looking from the rear of the machine, illustrating the lateral shifting of the master-pinion. Figs. 26, 27, and 28 are diagrammatic side views of the unmeshing-cam and its arm of the locking-lever, illustrating the successive positions of the parts. The parts intervening between the shifting collars on the unmeshing-arbor are omitted from these figures to facilitate an understanding of the arbor-shifting devices. Figs. 29 and 30 are side views of the setting-wheel, universal gear, and one arm of the locking-lever, showing the successive positions of the parts. Figs. 31, 32, 33, and 34 are diagrammatic views illustrating the operation of the digit-sectors and the unmeshing-bar. Fig. 35 is a front view of the receiving mechanism upon which the result of the calculation is indicated. Figs. 36 and 37 are sectional views of said receiving mechanism, taken on the line 36 36, Fig. 35, showing different positions of the rocking frames of the carrying mechanism. Figs. 38 and 39 are side and front views, respectively, of a figure-wheel. Fig. 40 is a side view, and Figs. 41 and 42 are edge views, of a rocking frame. Fig. 43 is a rear view in elevation, and Fig. 44 is a plan view from the front, showing the receiving mechanism. Fig. 45 is a front view of the fixed bars whereon the receiving mechanism travels. Figs. 46, 47, and 48 are sectional views of said bars, looking in the direction of the arrows on the lines 46 46 and 47 47 and 48 48, respectively, Fig. 45. Figs. 49, 50, and 51 are different views of the periphery of a carrying-wheel. Fig. 52 is a side view of a carrying-wheel, looking in the direction of the arrow, Fig. 49. Fig. 53 is a side view of a single cam-section of a carrying-wheel; and Fig. 54 is a side view of two cam-sections of said wheel, showing the manner in which they combine to form in this instance two overlapping carrying-teeth one hundred and eighty degrees apart. Figs. 55 and 56 are side views of the carrying wheels and pinions, illustrating the coöperation thereof. Fig. 57 is a face view of the carrying wheels and pinions, showing the relative positions thereof. Fig. 58 is a face view of a carrying-pinion. Figs. 59, 60, and 61 are sectional views of a carrying-pinion, looking in the direction of the arrows on the lines 59 59 and 60 60 and 61 61, respectively, Fig. 58. Fig. 62, adjacent to Fig. 2, is a detail view of the means for adjusting the depending carriage-arm laterally upon the carriage, the view being taken in section on the line 62 62, Fig. 4.

Similar numerals refer to similar parts throughout the several views.

For convenience the machine will be considered under the five general headings, to wit: The concentrating mechanism, which includes the key-action and connected parts operating to drive the digit-levers; the valuating mechanism, which transmits motion from said digit-levers to the master-pinion; the reversing mechanism, which transmits the motion from the master-pinion to the setting-wheel and determines in which direction the setting-wheel shall rotate; the locking mechanism for preventing accidental rotation of the setting-wheel; and the receiving mechanism, whereby the action of the setting-wheel controls the figure-wheels.

In the type-writer, 1 represents the framework; 2, the laterally-movable carriage; 3, the type-writer keys, and 4 the spacing-bar.

*The concentrating mechanism.*—The key-riders 5 are secured by means of the set-screws 6 to the shanks of such of the keys 3 as represent numerals, and said riders are pivotally connected to the bell-crank levers 7 by means of the links 8, as best shown in Figs. 2 and 6. Said crank-levers 7 are provided with a series of apertures 9 for receiving and engaging the upper extremities of said links to provide for adjustment between said levers and the keys 3. The base-plate 10 of the calculating mechanism is rigidly secured to the type-writer frame and carries the lugs 11, which form bearings for the rock-shafts 12 of the concentrating mechanism. Said lugs also form bearings for the fulcrum-shaft 13. Said crank-levers 7 are loosely mounted on said fulcrum-shaft and are kept in their proper relative positions thereon by means of the spacing-collars 14. The links 15 are connected at one extremity to said crank-levers 7 and at the other extremity to the rock-shaft arms 16. Said rock-shaft arms are rigidly fastened to the rock-shafts 12, and the parts are therefore so arranged that the depression of one of the figure-keys 3 of the type-writer causes the rotation of the respective crank-lever 7 upon the fulcrum-shaft 13 and the consequent rotation of the respective rock-shaft 12. In the present instance the operative rock-shafts 12 are nine in number, an idle tenth shaft being placed in the mechanism for the sake of symmetry and uniformity in manufacture. Said shafts are arranged in two groups of five each, each shaft having an independent bearing in the center one of the lugs 11 and one of the side lugs 11. Near said center lug each operative shaft 12 carries a rigidly-set digit-lever arm 17, and said arms 17 are connected to their respective digit-levers 18 by means of the links 19. This grouping of the rock-shafts and connected parts enables the effects of the action of the scattered keys 3 to be concentrated into a small space, thereby rendering possible a compact and convenient machine.

*The valuating mechanism.*—Said digit-levers 18 are loosely mounted on the fulcrum-shaft 20 and prevented from moving laterally thereon by means of the hubs of said levers. Said shaft is held in position by means of the plates 21 21, which are mounted on the base-plate 10 and form side walls for the machine. Said levers 18 extend in two directions from said shaft 20, one arm being connected to the links 19, as described, and the other arm carrying a pin 22 for actuating the digit-sectors 23. Said digit-levers also operate the unmeshing-bar hereinafter described. The throw of said levers 18 in one direction is limited by the bar 24, fixed in the side walls 21. Said sectors 23 are loosely mounted upon the fulcrum-shaft 25, which is fixed in the side walls 21. Said sectors are prevented from moving laterally upon said shaft by means of their hubs and by means of suitable spacing-collars. Said sectors are nine in number, one for each of said digit-levers 18. Said sectors are provided with two connecting cam-surfaces 27 and 28, which are acted upon by the pins 22 to rotate said sectors. Said surface 27, which forms a slot in said sectors, constitutes a double cam and extends approximately radially, so that when the parts are in normal positions, as shown in Fig. 31, said sectors are locked by said pins 22. The cam-surface 28 conforms to the arc of a circle and is so placed that when a sector is in the position shown in Figs. 33 and 34 the center of curvature of said cam-surface is coincident with the center of the shaft 20. The bars 29 and 30 are fixed in the side walls 21 and form stops for limiting the rotation of said sectors 23. The parts are so arranged that when in normal position the sectors 23 are in proximity to the stop-bar 29, the levers 18 are in proximity to the stop-bar 24, and the pins 22 are adjacent to the cam-surface 27, all substantially as shown in Fig. 31. The first part of the downward stroke of the type-writer key causes the pin 22 to travel along the cam 27, first moving inward toward the center of the sector 23, as shown in Fig. 32, and subsequently moving outward to the end of said cam, as shown in Fig. 33. When said pin has reached the end of said cam 27, the further rotation of said sector is prevented by the stop-bar 30. At this stage, however, the pin 22 has reached the beginning of the cam 28, which now lies concentric with the path of rotation of said pin. Said pin may therefore continue to move—for example, to the position shown in Fig. 34—so that the throw of the type-writer key is not limited by the digit-sectors 23; but said sector remains locked by said pin 22 until during the return stroke of the type-writer key said pin again reaches the cam 27. By preference said sectors 23 are all of the same general outline and have the same amount of rotation and differ from each other only in the number of teeth with which said sectors are provided. The digit-sector corresponding to the digit "9" has the highest number of teeth, the sector corresponding to the digit "8" has one tooth less, the sector corresponding to the digit "7" has two teeth less than the sector for digit "9," and so on. These gear-teeth 31 are for the purpose of rotating the universal gear 32, and it is therefore seen that the amount of rotation of the universal gear 32 depends on the number of gear-teeth 31 of the driving digit-sector. The amount of rotation of the universal gear 32 is therefore greatest for the digit "9," is one step less for the digit "8," is another step less for the digit "7," and least of all for the digit "1." In the present machine the gear-teeth 31 are removed from the forward part of the sector—that is to say, the part which would first come into contact with the universal gear 32 when the sector is starting from the normal position. Said gear 32 is revolubly mounted upon the trunnions 33, which have a bearing in the side walls 21. Said gear 32 extends across all of said sectors 23, so that it may be rotated by any one thereof. Said gear 32 is also adapted to drive the laterally-shiftable master-pinion 34 when said pinion is opposite to the toothed portion of said gear. In order that said pinion may be disconnected from said gear during the return motion of the latter, said gear is provided with a space 35, which is devoid of teeth. As a result when said pinion is opposite to said space said pinion is not rotated by said gear. Said master-pinion is rigidly attached to its arbor 36, as are also the collars 37 and 38. Said arbor 36 is free to both rotate and slide in the walls 21. Said pinion 34 can thus be shifted into two positions, one shown in Fig. 24, in which said pinion is opposite to the toothed portion of the gear 32. The other position of said pinion is shown in Fig. 25, in which said pinion is opposite to the blank space 35 of said gear 32, above mentioned. When in normal position, said pinion is opposite to said toothed portion of gear 32, as shown in Fig. 24. When the type-writer key is depressed, said gear 32 drives said pinion 34. Should the type-writer key not have been sufficiently depressed, then on the return stroke of said key the gear 32 will drive the pinion 34 back to its original position; but if said key is sufficiently depressed then said pinion is freed from connection with the gear 32 during the return of the latter by being shifted out of mesh therewith toward the end of the downward stroke of said key, as shown in Fig. 25. The shifting of the master-pinion 34 out of mesh with the gear 32 is accomplished by means of the unmeshing-cam 39. Said cam is wedge-shaped and is carried upon the side of the plate 40 in such a manner that when said plate is rotated said cam will engage the collar 37 and shift the spindle 36 to bring the pinion 34 opposite to the space 35 when it is out of mesh with the gear 32. Said plate 40 is rigid with the unmeshing-bar 41, said bar being revolubly supported in the side walls 21 by means of the trunnions 42. The rotation of said unmeshing-bar 41 is effected by means of the arms 43, formed on said bar and actuated by the digit-levers 18, after said levers have driven the digit-sectors 23 to the limit of their rotation against the bar 30, as shown in Figs. 22, 33, and 34. Fig. 22 illustrates the position in which the sectors 23 have finished their rotation in a positive direction and the arms 43 and plate 40 are about to commence their rotation in a positive direction. The spaces between said arms 43 are provided so as to make room for the cam extensions 28 on the sectors 23, thereby permitting the free motion of the parts. The spring 44, which encircles the unmeshing-bar 41, is attached at one end to said bar and at the other end to the pin 45 in one of the side walls 21 and tends to bring said bar and the arms 43 back into initial or normal position. The stop-pins 46 and 47 (best indicated in Figs. 26, 27, and 28) are fastened in the side wall adjacent to the cam-plate 40. The pin 47 prevents the said plate from rotating too far in a positive direction, while the pin 46 prevents said parts from rotating too far on the return. The shifting of the master-pinion 34 back into a position to mesh with the gear 32 is accomplished by means of the cam 48, which is rigidly fixed to said gear 32 and engages the collar 38 on the arbor 36. Said inshifting-cam is wedge-shaped and coöperates with the unmeshing-cam 39 to control the lateral position of said pinion. Said cam 48 is so constructed that when the type-writer key is up and the parts are in normal position the pinion 34 is laterally held, so as to mesh with said gear, as shown, for example, in Figs. 20 and 24. Said cams 39 and 48 are so timed that the unmeshing-cam 39 shifts the pinion 34 out of mesh with the gear 32 after the said gear has completed its rotation in a positive direction, and the cam 48 shifts said pinion back into its original position just prior to the end of the return rotation of said gear. The operation of the arms 43, which are rigid with the unmeshing-cam 39, is illustrated in Figs. 22, 31, 32, 33, and 34. Inasmuch as the last portion of the return rotation of the said gear 32 is required for the shifting back into mesh of the pinion 34 with the gear 32, a blank space 49 is provided on said gear free from teeth. This permits said pinion to complete its shifting without interference from the gear 32. On account of said blank space 49 the gear 32 rotates a slight distance in its positive direction before it begins to drive said master-pinion. This lost motion is constant for all the digit-sectors 23, because said gear 32 is always stopped at the same point in its return rotation. The stopping of the gear 32 at its initial or normal position is attained in the present instance by a supplemental gear 50, (best shown in Figs. 6 and 20,) which is in mesh with the gear 32 at a portion 51 thereon. Said portion 51 of the gear 32 has a full complement of teeth, so that said gears 32 and 51 are always in mesh. Said gear 50 is revoluble upon the shaft 52. The spring 53 is fastened at one end to said gear and at the other end to said shaft, said shaft being supported in the side walls 21. Said spring 52 tends to rotate said gear in such a direction as to drive the gear 32 to its initial or normal position. The return rotation of said gears is limited by the pin 54 in the hub of the gear 50, which strikes the stop-pin 55, fastened in the adjacent wall 21.

The program of operation of the mechanism for driving and shifting the master-pinion 34 is as follows: When the type-writer key is up and the machine in normal position, said pinion is in juxtaposition to the space 49 and the collar 37 lies in the path of the cam 39, as best shown in Figs. 20 and 24. As the typewriter key moves downward it causes a digit-sector 23 to rotate, and in due time, depending upon the value of the respective digit, said sector commences to drive the gear 32. The first part of the rotation of said gear will not affect the pinion 34 on account of the absence of teeth at the space 49. As soon as said gear 32 has rotated an amount equal to said space said gear commences to rotate said pinion and drives the same until further motion is prevented by the sector coming against the stop-bar 30. Subsequently the arms 43 are engaged by the digit-levers 18, and the consequent rotation of the unmeshing bar 41 causes the cam 39 to approach the collar 37 and force it aside, thereby shifting the pinion 34 out of mesh with the gear 32. Said pinion is now opposite to the blank space 35 on said gear. The rotation of said gear has caused the rotation of the gear 50 against the force of the spring 53 and the rotation of the cam 39 has been against the force of its spring 44. This much occurs prior to the end of the downstroke of the type-writer key. On the return of the type-writer key the arms 43 first return to their normal position under the influence of the spring 44. Next the returning digit-sectors drive the gear 32 in the return direction; but the pinion 34 being out of mesh with said gear does not rotate. Near the end of the return or negative rotation of the gear 32 the cam 48 thereon engages the collar 38 and shifts the pinion 34 back into its initial position ready to be driven by said gear on the next stroke thereof. The contact of the pin 54 on the gear 50 against the pin 55 prevents the gear 32 from returning too far. The return rotation of said gear 32 is assisted by the spring 53 acting on the supplemental gear 50. The inshifting of the pinion 34 by the cam 48 is complete before the type-writer key reaches the end of its return stroke.

*The reversing mechanism.*—The reversing mechanism illustrated separately in Figs. 8 and 9 comprises the gear 34, 56, 57, and 58, said gears 57 and 58 transmitting motion from the master-pinion 34 to the setting-wheel 58. Said gear 56 is loosely mounted on the reversing-shaft 59, which is slidingly supported in the side walls 21 and projects at each end beyond said walls. The arms 60 60 are rigidly fixed on said shaft 59 and prevent the wheel 56 from moving laterally thereon, said wheel having on one side an elongated hub 61 for bearing against the adjacent arm 60. Said arms 60 extend to and loosely encircle the shaft 62. Said shaft is fixed in the side walls 21 and the wheel 57 is free to revolve and slide thereon. Said wheel 57 has an elongated hub 63, and said arms 60 control the lateral position of said wheel, so that when the reversing-shaft 59 is slid in its bearings it shifts the arms 60 60, and consequently the wheels 56 and 57. Shafts 59 and 62 are so placed that the wheels 56 and 57 mesh with each other and each may mesh with the master-pinion 34. The setting-wheel 58 is revolubly mounted on the shaft 64, but is prevented from lateral motion thereon by means of the sleeves 65. Shaft 64 is supported by the walls 21. The gear 57 is broad-faced and may be shifted to its extreme positions without becoming out of mesh with the setting-wheel 58. The wheels 56 and 57 have a portion of their toothed faces overlapping, so as to be always in mesh with each other; but said surfaces extend in opposite directions from the said overlapping portion, so that when the gear-wheel 56 is in mesh with the pinion 34 the wheel 57 is out of mesh with said pinion, and when the gear-wheel 57 is in mesh with said pinion the wheel 56 is out of mesh therewith.

The parts of the reversing mechanism are so related that when the shaft 59 and arms 60 are in the extreme position (shown in Fig. 9) the pinion 34 meshes with the wheel 56, the wheel 56 meshes with the wheel 57, and the wheel 57 meshes with the setting-wheel 58; but when the shaft 59 and arms 60 are in the other extreme position, as shown in Fig. 8, the pinion 34 is out of mesh with the wheel 56, but is in mesh with the wheel 57, and said wheel 57 is in mesh with the setting-wheel 58. In the first-described position (shown in Fig. 9) there are two gear-wheels interposed between the pinion 34 and setting-wheel 58, and therefore said setting-wheel rotates in the opposite direction to said pinion. In the second position (shown in Fig. 8) the gear 56 is aside, and there is only the wheel 57 interposed between said pinion and setting-wheel, which therefore rotate in the same direction. Consequently the lateral shifting of the bar 59 causes a reversal in the direction of rotation of the setting-wheel 58.

*The locking mechanism.*—For preventing accidental rotation of the setting-wheel 58 a locking mechanism is provided, which is constructed as follows: The locking-lever 65 is rigidly fastened on the rock-shaft 66 and is adapted to engage the setting-wheel 58 and operate as a detent therefor. Said shaft is revolubly supported in the side walls 21, but is laterally immovable therein. The arm 67 is also rigidly fixed to said shaft 66 and is operated by the cam 68, rigidly set upon the gear-wheel 32. (See Figs. 6, 23, 26, 29, and 30.) As hereinabove mentioned, the gear 32 has a certain lost motion at the first part of its positive stroke, and during this time the pinion 34 is not controlled by said gear 32. The cam 68 is so constructed that it holds the locking-lever 65 in engagement with the setting-wheel 58 during the said first part of the stroke of the gear 32, while the pinion 34 is not engaged by said gear. This condition is shown in Fig. 29, the arrow showing the positive direction of rotation of the gear 32. The spring 69 (best shown in Fig. 12) encircles the rock-shaft 66 and is fastened at one end to said shaft and at the other end to the shaft 30 or other fixed part of the machine. The tendency of said spring is to throw the locking-arm 65 out of engagement with the setting-wheel 58. Just before the gear 32 has rotated far enough in the positive direction to engage the pinion 34 said cam releases the arm 67, so that the spring 69 throws the locking-lever 65 out of engagement with the setting-wheel 58, as shown in Fig. 30. Said setting-wheel is then free to be driven by the gear-wheel 32, acting through the medium of the pinion 34 and the gear-wheels of the reversing mechanism. As soon as the gear 32 has driven the setting-wheel 58 the required amount the locking-lever 65 is thrown into engagement with the latter by means of the relocking-arm 70. (Best shown in Figs. 12, 23, 26, 27, and 28.) Said relocking-arm is operated by means of the pin 71, which is located at the outer extremity of said arm and travels upon the edge of the plate 40. Said edge of the plate 40 forms two cam-sections 72 and 73 for operating said pin 71, said cam-section 73 being circular and concentric with the trunnions 43, whereon said plate 40 is mounted. The cam-section 72 lies nearer to said trunnions and permits the pin 71 to move inward, thereby allowing the spring 69 to drive the rock-shaft 66, so that the lever 65 releases the setting-wheel 58. When the pin 71 is adjacent to the circular cam-section 73, the locking-lever 65 engages said setting-wheel and prevents the rotation thereof. At the beginning of the positive or downward stroke of the type-writer key when the lever 65 is held in engagement with the setting-wheel 58 by the cam 68, as shown in Fig. 29, the pin 71 on the lever 70 is away from the cam-plate 40, as shown in dotted lines, Fig. 26. At this time said cam-plate is in its initial position, where it is held against the stop-pin 46 by means of the spring 44. As the type-writer key moves downward and the gear 32 is rotated, so as to remove the cam 68 from contact with the rock-shaft arm 67, the spring 44 releases the locking-lever 65 from the setting-wheel. This brings the pin 71 into contact with the cam-section 72, as shown in full lines in Fig. 26. After the gear 32 has completed its rotation in a positive direction the cam-plate 40 begins to rotate in the direction of the arrow, Fig. 26, thereby bringing the circular cam-section 73 adjacent to the pin 71 and throwing the locking-lever 65 into engagement with said setting-wheel. Inasmuch as the cam-section 73 is concentric with said plate 40, said plate is free to rotate farther in its positive direction; but said locking-lever does not release the setting-wheel until on the return rotation of the cam-plate 40 the cam-section 72 comes adjacent to the pin 71.

*The receiving mechanism.*—The receiving mechanism is not attached to the stationary side walls 21, but is independent thereof, being mounted in a separate laterally-shiftable frame, which in the present machine is located above the working parts hereinabove described. The side walls 74 74 of the receiving mechanism are provided with sleeves or bosses 75 75, whereby said walls are slidingly mounted upon the bars 76 and 77. Said bars are screwed at their ends to the brackets 78 78 on the frame-plate 79. Said frame-plate is screwed to uprights of the framework 1 of the type-writer. The brackets 80 80 are are screwed to said frame-plate 79 and to the side walls 21, thereby forming a rigid connection between said parts. The receiving-wheels 81 are loosely mounted on the shaft 82, but are prevented from sliding laterally thereon by means of spacing-collars. (Best shown in Fig. 35.) Said shaft is fixed in the walls 74 of the receiving mechanism. Said receiving-wheels are placed equidistant from each other, and their distance apart is equal to one complete step of the type-writer carriage. The receiving mechanism shifts laterally with the type-writer carriage, as will be hereinafter described, and the wheels 81 are so placed that said wheels will be brought into mesh with the setting-wheel 58 successively upon the successive steps of the type-writer carriage—that is to say, the escapement of the type-writer carriage one full type-space will bring the next adjacent receiving-wheel into mesh with said setting-wheel. The number of receiving-wheels is equal to the number of figure-wheels of the calculating mechanism and determines the value of the highest number which can be shown on the mechanism. The wheels 81 mesh with the gear-wheel 83, one of said wheels 83 being secured to each of the figure-pieces 84 for rotating the latter. Said figure-pieces or figure-wheels and the gear-wheels 83 are loosely mounted on the shaft 85, but are prevented from sliding laterally thereon by the spacing-collars 86. Said figure-wheels carry on their periphery a series of numerical characters or digits in the manner common to calculating-machines. The number of teeth on the gear-wheels 83 is equal to the number of figures on said figure-wheels. In the present machine each figure-wheel has one set of figures and each gear-wheel 83 is provided with ten teeth. The shaft 83 is rigidly supported in the walls 74.

As above stated, the receiving mechanism moves with the type-writer carriage, and in the type-writer here shown the movement of the carriage is from right to left looking at the front of the type-writer, as in Fig. 1. In order that each receiving-wheel 81 may be locked prior to the time when it comes into mesh with the setting-wheel 58, the lower bar 76 is provided with a fin 87, (best shown in Figs. 45 and 47,) which engages the teeth of said receiving-wheel and locks the same. Said fin lies to the right of the position occupied by the setting-wheel 58 and terminates at a point such that any given receiving-wheel is released from said fin just before coming into mesh with said setting-wheel. By this construction the receiving-wheels are locked by said fin until they are engaged by said setting-wheel.

In order to eliminate the effect of looseness or "backlash" in the gearing and complete the effect of the setting-wheel 58, said receiving-wheels are alined after leaving said setting-wheel by means of the pin 88, which engages said receiving-wheels momentarily as they leave said setting-wheel. Said pin 88 extends only a short length, so that one receiving-wheel is disengaged therefrom by the time the next succeeding receiving-wheel is in mesh with the setting-wheel. The remainder of the bar 76—that is, the part lying to the left of the pin 88—is cut away, so as not to interfere with the rotation of the receiving-wheels after they have passed said pin.

The tens-carrying mechanism for transmitting the proper rotation to the figure-wheels after they have passed the setting-wheel 58 will now be described. Each receiving-wheel 81 meshes with its respective carrying-wheel 89. Said carrying-wheels are loosely mounted upon the shaft 90, but are laterally immovable thereon. Said shaft is rigidly supported in the walls 74. Said carrying-wheels (shown separately in Fig. 49 and adjacent figures) are composed of three sections 91, 92, and 93, which may be cut from a single block or formed separately and afterward brazed or otherwise secured together to act as a single piece. Looking from the front, as in Fig. 49, the section 91 lies upon the right and consists of a complete toothed gear-wheel. The number of teeth on said section 91 is a multiple of twenty, the present wheel having twenty teeth. The section 93 at the left is a counterpart of section 92 in the middle and consists of a disk having a circular periphery divided into two portions of different diameter. The portion of greater diameter corresponds to the point-circle and the portion of smaller diameter corresponds to the root-circle of a toothed gear-wheel. The point-circle portion of each of said disks exceeds a semicircumference by the space of one tooth, and said sections 92 and 93 are so arranged in the carrying-wheel that said point-circle portions overlap each other an area equal to two teeth. These overlapping areas constitute carrying-teeth and are located one hundred and eighty degrees apart—as shown, for example, in Figs. 54 to 56. The tens-carrying pinions 94 (best shown in Figs. 58 to 61) are also formed in three sections 95, 96, and 97, acting as a single piece. Looking from the front the section 95 is located at the left and consists of a complete toothed gear having an even number of teeth, the present number being eight. Section 97 on the right is a counterpart of section 96 in the middle, which is a gear-wheel like the wheel 95, except that each alternate tooth is lacking. In the present machine each of the sections 96 and 97 have four teeth like those of the section 95, but the arrangement is such that the teeth on the section 96 are adjacent to the spaces due to the missing teeth on the section 97. The teeth on the central section 96 are continuous with the teeth on the section 95, so that when viewed in the direction of the arrow, Fig. 58, the carrying-pinions have the appearance of an eight-toothed gear having a full complement of teeth. Said pinions are adapted to mesh with the carrying-wheels 89 and are so placed relatively thereto that the sections 96 and 97 of any given pinion engage with the sections 93 and 92, respectively, of a carrying-wheel, but the section 95 of said pinion engages with the section 91 on the next carrying-wheel to the left, as shown in Fig. 57. In other words, each carrying-pinion engages two different carrying-wheels, and the rotation of any given carrying-wheel is carried to the next adjacent carrying-wheel on the left through the agency of their common carrying-pinion. When a carrying-pinion is in engagement with its carrying-wheels and the point-circle portion of a section 92 is adjacent to a pinion-section 97, said point-circle portion enters between two teeth on said section 97 and prevents the rotation thereof, as shown in full lines in Fig. 56. At this time a tooth on the section 96 of said pinion lies adjacent to the root-circle portion of the section 93 and is therefore in position to be engaged by the approaching point-circle portion of said section 93, as shown in dotted lines, Fig. 56. As the point-circle portion or section 93 engages the tooth on section 96 the point-circle portion on section 92 simultaneously releases section 97. The passing of one carrying-tooth on the carrying-wheel therefore causes the carrying-pinion to rotate a distance equal to the circular pitch of the pinion-teeth. It is thus evident that the carrying-wheels alternately lock and rotate the carrying-pinions, the rotation of a pinion occurring when a carrying-tooth passes said pinion. Since said pinion is in mesh with the next higher carrying-wheel, the rotation of any given carrying-wheel is thus communicated to the next higher carrying-wheel, thereby carrying the tens.

Each carrying-pinion is mounted upon an independent shaft 98, supported in its rocking frame 99. Said pinions are loose upon their shafts 98, but are prevented from moving laterally thereon by the forked extremities 100 of said frames. (Shown in Figs. 40 to 42.) Said frames are arranged in two series or gangs pivoted upon the shafts 101 101 in such a manner that the carrying-pinions 94 lie alternately on opposite sides of the carrying-wheels 89, as best shown in Figs. 36, 37, 43, and 44. Said shafts 101 are fixed in the walls 74. By means of said rocking frames said carrying-pinions are swung into and out of mesh with the carrying-wheels 89, and when said pinions are out of mesh they are prevented from rotating by means of the fixed locking-bars 102 in the manner shown in Fig. 37. Said locking-bars are slotted to receive the teeth of said pinions and are rigidly secured to the walls 74.

The alternate arrangement of the rocking frames 99 is best illustrated in Figs. 43 and 44, wherein it is shown that the rocking frames of one gang or series are laterally intermediate of the frames of the opposite gang or series. The chief purpose in thus grouping the rocking frames and pinions in two series is to gain sufficient room for said frames, so that said pinions may gain access to said carrying-wheels.

The position of any rocking frame radially about its pivot for swinging the pinions 94 toward or from the carrying-wheels 89 is determined by the cross-section of the upper bar 77 at the particular point at which said frame is for the moment located. The normal position of the rocking frames just before the receiving-wheels 81 reach the setting-wheel 58 is such that the carrying-pinions 94 are out of mesh with the carrying-wheels 89 and are locked by the bars 102, as shown in Fig. 37. The cross-section of said bar 77 is symmetrical with respect to the two gangs of rocking frames, and to facilitate description let it be supposed that a reference-plane $x\,x$, Figs. 36, 37, 46, 47, and 48, be passed through said bar 77 at right angles to a plane containing the centers of the locking-bars 102. Now referring to the upper gang of rocking frames and to the portion of the bar 77 lying above the plane $x\,x$ and also referring to that portion of the length of the bar 77 which lies to the right of the setting-wheel the cross-section of said bar is such that the toe 103 of the rocking frame 99 is at its farthest distance from the central axis of said bar, as shown in Fig. 37. At the same point of cross-section of said bar the portion adjacent to the toe 104 of said frame is cut away, so as not to interfere with said toe 104. As soon as the first receiving-wheel 81 has passed into engagement with the setting-wheel 58 the first carrying-pinion 94 is swung into mesh with its two carrying-wheels, so that the tens may be carried to the higher figure-wheel, which has now passed beyond said setting-wheel.

The cross-section of bar 77 for holding the pinions 94 in mesh with the carrying-wheels is shown in Figs. 36 and 46. Said cross-section is such that the toe 104 is farthest from the central axis of bar 77, while the portion of said bar adjacent to the toe 103 is cut away, so as not to interfere with said toe 103. At the point where the actual swinging of the rocking frames 99 takes place said bar 77 is further cut away for avoiding interference with the frame-toes. The cross-section of said bar at this point is illustrated in Figs. 45 and 48. The socket 105 is fastened to one of the walls 74 and is adapted to receive the lower extremity of the depending controlling-arm 106. Said arm is carried by the sleeve 107, slidingly mounted on the toothed rack-bar 108. Said rack-bar extends across the front of the type-writer carriage 2 and is fastened thereto by means of the clips 109. In order that the position of the sleeve 107 and arm 106 may be adjusted on the bar 108, said sleeve is provided with a pin 110, having a tooth 111 for engaging the teeth on said bar. Said pin is mounted in said sleeve so as to slide therein transversely to the length of said bar, and the spring 112 on said pin acts against said sleeve in such a manner as to force said tooth 111 into engagement with the teeth on said rack-bar. When it is desired to adjust said sleeve on said bar, the pin 110 is temporarily forced out of engagement with said rack-bar and then permitted to spring back into engagement therewith after said sleeve has been shifted to the desired position. It is by means of said arm 105 and the parts connecting the same to the type-writer carriage 2 that the travel of said carriage is imparted to the receiving mechanism mounted in the walls 74, and the adjusted position of said arm to said rack-bar determines the point at which the receiving-wheels 81 will be in mesh with the setting-wheel 58. This adjustment therefore determines the position on the page whereat the calculating-machine is operative. The socket 105 has parallel sides which loosely engage the lower extremity of the depending bar 106, so that the travel of the type-writer carriage causes a corresponding travel of the receiving mechanism; but the sides of said socket permit the fore-and-aft motion of said depending bar, so as to permit the fore-and-aft motion of the typewriter carriage in shifting from upper to lower case type.

In order to protect the mechanism, the parts within the side walls 21 are inclosed within a casing 113 and the parts within the walls 74 are inclosed within the casing 114. The slot 115 is formed in the casing 114 in front of the figure-wheels, so as to expose the number set up thereon.

In operation when it is desired to print a series of numbers in a column the type-writer carriage is first brought by the operator to such a position that the first figure of the number will occupy its proper digital position—that is to say, will have its proper place value. The units will occur at the extreme right of the column on the printed page, tens in the next place to the left, hundreds in the third place, and so on. In the figure-wheels also when looking at the front of the machine the digit figure-wheel is at the extreme right. Inasmuch as the carriage and receiving mechanism travel from right to left, the digit figure-wheel will be the last one to be in gear with the setting-wheel 58. On account of the shape of the pinion-swinging bar 77 when the units figure-wheel is in gear with the setting-wheel 58 all of the carrying-pinions 94 are in mesh with their carrying-wheels 89, so that the tens will be properly carried. In general it may be stated that when any given figure-wheel is in direct gear with a type-writer key all of the figure-wheels to the left are in connection, so that the tens may be carried thereto, while all of the figure-wheels to the right are uninfluenced by said key. Suppose that the number "487" appears on the printed page and also on the figure-wheels and that the number "35" is to be added—

```
 487
  35
 ———
```

Result, 522

The operator sets the type-writer carriage so that when the "3" key is struck the character "3" will be printed on the page in the tens-column. This setting of the carriage brings the receiving mechanism to such a position that the tens figure-wheel is in direct gear with the setting-wheel. When the operator strikes the key, the "3" is printed on the page beneath the "8" and the said tens figure-wheel is rotated three spaces, thereby causing it to show "1," while the carrying mechanism rotates the hundreds figure-wheel one space, so as to show "5." In reality as far as the calculating mechanism is concerned thirty has been added to four hundred and eighty-seven, and the figure-wheels now show "517," the units figure-wheel having remained unchanged. The action of printing the figure causes the type-writer carriage to travel to the next type-space, and consequently causes the receiving mechanism to travel so that the units figure-wheel will be in direct gear with the setting-wheel. The operator now strikes the "5" key, which causes the type-writer to print "5" beneath the "7" and also causes the units-wheel to rotate five spaces. This amount of rotation causes said units-wheel to show "2," while the carrying mechanism causes the tens figure-wheel to rotate one space, so as to also show "2." The figure-wheels now show "522," which is the total sum of the numbers given for computation. If other numbers are to be added, the procedure is the same, the figure-wheels showing the complete results as the printing progresses. In subtracting the operation of the parts included between the type-writer keys and the receiving-wheels is the same as in addition, with the exception of the operation of the reversing-gear. The function of said reversing-gear is simply to determine whether the setting-wheel and the master-pinion shall rotate in the same or opposite directions.

When the machine is to perform subtraction, the bar 59 is shifted so as to reverse the direction of rotation of the setting-wheel 58. This causes every wheel in the receiving mechanism to reverse the direction of its rotation, and the mechanism therefor subtracts instead of adding. When the last number has been printed and the result read and it is desired to reset the figure-wheels to zero, the reversing-shaft 59 is set for subtraction. The type-writer carriage is then shifted to such a position that the setting-wheel 58 is in gear with the figure-wheel having the highest value found in the number. The number is then struck on the figure-keys in the usual manner, and as the setting-wheel now subtracts the figure-wheels are brought back to zero. It is evident, therefore, that, if desired, the machine may be so set that the act of printing the result will reset the figure-wheels to zero.

Attention is directed to the fact that if it is desired to use the type-writer without employing the calculating mechanism said mechanism may be disconnected by raising the type-writer carriage and moving the receiving mechanism to one side upon its supporting-bars. The motion of the type-writer carriage in such case will not affect the receiving mechanism.

What I claim, and desire to secure by Letters Patent, is—

1. In a calculating-machine, the combination of a fulcrum-shaft, a series of bell-cranks loosely mounted thereon, rock-shafts operated by said bell-cranks, an axle, a series of figure-pieces mounted on said axle and bearing digits, and connections between said rock-shafts and said figure-pieces for operating the same.

2. In a calculating-machine the combination of a set of figure-keys, a rock-shaft for each of said keys, an arm on each of said shafts having linked connections to its figure-key, and a second arm on each of said rock-shafts for setting up the digits.

3. In a calculating-machine the combination of a set of figure-keys, riders upon each of said keys, a rock-shaft for each of said keys, an arm upon each of said rock-shafts, link connections between said arm and its key-rider, and a second arm on each of said shafts for setting up the digits.

4. In a calculating-machine, the combination of a set of figure-keys, key-riders attached to the shanks thereof, a rock-shaft for each of said keys, an arm upon each of said shafts for rocking the same, a fulcrum-shaft, a series of bell-cranks loosely mounted thereon, pivotal connections between each of said bell-cranks and its respective rock-shaft arm, adjustable connections between each of said bell-cranks and its respective key-rider, and a second arm on each of said rock-shafts for setting up the digits.

5. In a calculating-machine, the combination of key-operated rock-shafts arranged in two groups lying in the same plane, and having their axes coincident in pairs, said shafts having their extremities adjacent in pairs, calculating mechanism and lever-arms rigidly carried by said rock-shafts near their adjacent extremities for operating said calculating mechanism.

6. In a calculating-machine, the combination of a series of independent digit-sectors for setting up the digits, a vibratory digit-lever for operating each of said sectors, figure-keys, connections between said keys and said levers for operating the same, and a stop-bar extending transversely to said levers for determining the end of the return stroke thereof.

7. In a calculating-machine, the combination of a series of independent digit-levers, means for operating the same, pins on said levers, a series of digit-setting pieces each having the same amount of movement for setting up the digits, and slots in said digit-setting pieces for receiving the pins on said levers, whereby said digit-setting pieces are actuated.

8. In a calculating-machine, the combination of a fulcrum-shaft, a series of digit-levers independently mounted thereon, key-operated links for operating said levers, a series of oscillating pieces for setting up the digits, all of said oscillating digit-setting pieces having the same amount of oscillation, and slots in said digit-setting pieces for receiving the pins on said digit-levers whereby said digit-setting pieces are oscillated.

9. In a calculating-machine, the combination of a fulcrum-shaft, a series of bell-cranks thereon, corresponding to the number of digits in the series, key connections for rotating said bell-cranks, a rock-shaft connected to and operated by each of said bell-cranks, and digit-sectors connected to and operated by said rock-shafts for setting up the digits.

10. In a calculating-machine, the combination of a fulcrum-shaft, key-operated digit-levers independently mounted thereon, each of said levers being provided with a pin; and slotted digit-sectors for setting up the digits, the pins on said levers entering the slots in said sectors to drive said sectors.

11. In a calculating-machine, the combination of digit-sectors for setting up the digits and key-actuated pins for actuating said sectors, said pins moving in a circular path and contacting said sectors on the edges thereof, a portion of the edge of each sector having a radius of curvature equal to the radius of the path of its contacting pin, whereby said sector may remain stationary while the said pin is in contact with the circular portion of said sector.

12. In a calculating-machine, the combination of digit-sectors for setting up the digits, pivoted key-actuated digit-levers, pins on said levers, and circular cams on said sectors, each having a radius of curvature equal to the radius of the path of its pin about the pivot thereof, whereby said sector is prevented from rotating in at least one direction when the said pin is in contact with the circular sector-cam.

13. In a calculating-machine, the combination of a series of independently-movable digit-sectors for setting up the digits, a pivoted lever for each of said sectors, means for operating said levers, and a slot-and-pin connection between said levers and said sectors whereby said levers control the position of said sectors.

14. In a calculating-machine, the combination of digit-sectors for setting up the digits, pivoted levers for actuating said sectors, means for operating said levers, a pin on each of said levers, a cam-slot in each of said sectors coöperating with the pins on said levers whereby the position of said sectors is controlled by said levers; and circular cams on said sectors continuous with said cam-slots, said circular cams coöperating with said pins and each having a radius of curvature equal to the radius of the path of its pin, whereby said sectors are locked without limiting the movement of the levers.

15. In a calculating-machine, the combination of pivoted digit-sectors rotating forward and back for setting up the digits, pivoted levers for rotating said sectors, a stop for limiting the forward stroke of said sectors, pins on said levers, and circular cams on said sectors coöperating with said pins and having a curvature corresponding to the path of said pins, whereby when said pins are in contact with said circular cams, said sectors are locked by said pins on one side and said stop on the other side.

16. In a calculating-machine, the combination of a vibratory digit-lever, means for operating the same, a vibratory digit-sector operated by said lever, a stop for limiting the back stroke of said sector, and a pin on said lever for making contact with a portion of said sector when said sector is adjacent to said stop, said pin and said stop thereby locking said sector at the end of the back stroke thereof.

17. In a calculating-machine, the combination of pivoted digit-sectors for setting up the digits, a pivoted key-actuated digit-lever for each of said sectors, a pin on said lever for driving and detaining its sector, and two cam-surfaces upon each of said sectors, one of said cam-surfaces coöperating with said pin to rotate the sector, and the second of said cam-surfaces being curved to correspond with the path of said pin when in contact therewith.

18. In a calculating-machine, the combination of key-actuated digit-levers, pins on said levers, toothed digit-sectors, rotating forward and back, a slot-like cam on each of said sectors to receive said lever-pins; a circular cam on each of said sectors, continuous with said slot-like cams whereby the backward rotation of said sector is prevented when said lever-pins are in contact with said circular cams; and a universal gear-wheel for setting up the digits, said gear being adapted for engagement with any one of said sectors.

19. In combination, the toothed digit-sectors, key connections thereto, a universal gear-wheel rotated forward and back by said sectors, a master-pinion for setting up the digits, and means for shifting said pinion into mesh with said universal gear for the forward rotation thereof and out of mesh with said universal gear for the backward rotation thereof.

20. In a calculating-machine, the combination of a laterally-shiftable master-pinion normally rotating in one direction to set up the digits; a toothed gear rotating forward and back and actuating said pinion; means for rotating said gear forward and back; means for shifting said pinion into and out of mesh with said gear; and a space on said gear for receiving said pinion after the same has been shifted at the end of the positive stroke of said gear, said pinion being thereby out of mesh with said gear when opposite to the said space.

21. In a calculating-machine, the combination of a laterally-shiftable master-pinion normally rotating in one direction to set up the digits; a toothed gear rotating forward and back and actuating said pinion; a space on said gear devoid of teeth opposite to which space said pinion is shiftable to be out of mesh with said gear; means for shifting said pinion opposite to said space at the end of the positive stroke of said toothed gear; and other means for shifting said pinion opposite to the toothed portion of said gear prior to the end of the return stroke thereof.

22. In a calculating-machine, the combination of a laterally-shiftable master-pinion normally rotating in one direction to set up the digits; a toothed gear rotating forward and back and actuating said pinion; means for shifting said pinion into and out of mesh with said gear; and a lost-motion space on said gear for non-interference with said pinion while the same is being shifted back into its normal position to mesh with said gear.

23. In a calculating-machine, the combination of a master-pinion normally rotating in one direction to set up the digits, a toothed gear rotating forward and back, and actuating said pinion, means for rotating said gear forward and back, means for laterally shifting said master-pinion along said toothed gear, a space on said toothed gear devoid of teeth whereto said pinion is shiftable for the back motion of said gear; and a second space on said toothed gear for non-interference with said pinion during the shifting of said pinion laterally to the initial position thereof.

24. In a calculating-machine, the combination of a series of key-operated digit-sectors each having the same amount of rotation, and teeth depending in number upon the digital value of said sectors; a universal gear driven forward and back by said sectors, a shiftable master-pinion for setting up the digits, a cam device for shifting said pinion into mesh with said gear for the forward rotation thereof, and means for shifting said pinion out of mesh with said universal gear during the backward rotation of said gear.

25. In combination, a master-pinion normally rotating in one direction, a universal gear rotating forward and back and actuating said pinion, a series of key-actuated digit-levers connected to said universal gear for rotating the same forward and back, means for throwing said master-pinion into engagement with said universal gear for the forward rotation thereof, and a cam device operated by said digit-levers for throwing said master-pinion out of engagement with said universal gear during the return rotation thereof.

26. In a calculating-machine, the combination of a key-driven universal gear rotating forward and back and a master-pinion actuated by said gear, and normally rotating in only one direction to set up the number, means for shifting said master-pinion into mesh with said gear, and other means for shifting said pinion out of mesh with said gear after the forward stroke thereof is completed, said last-mentioned shifting means being inoperative upon said pinion prior to the completion of the forward stroke of said gear.

27. In a calculating-machine, the combination of digit-sectors rotating forward and back; a stop for limiting the forward stroke of said sectors; key-operated digit-levers for actuating said sectors; a cam and pin device for locking said sectors in position against said stop; a universal gear rotated back and forth by said sectors; a master-pinion shiftable into and out of connection with said gear; means operated by said digit-levers for shifting said pinion out of connection with said gear, said levers being inoperative upon said shifting means prior to the locking of said sectors against said stop, said pinion thereby being caused to rotate backward during the return stroke of said gear in case the forward stroke of the digit-sectors is incompleted; and other means for shifting said pinion into mesh with said gear for the forward stroke of the latter.

28. In a calculating-machine, the combination of a shiftable master-pinion for setting up the digits, said pinion normally rotating in one direction only, a gear having a forward and backward rotation, a cam connected with said gear for shifting said pinion into position to mesh with said gear, for the forward stroke of said gear, and means for shifting said pinion out of mesh with said gear at the end of the forward stroke thereof.

29. In a calculating-machine, the combination of a shiftable master-pinion for setting up the digits, said pinion normally rotating in one direction only, a gear having a backward and forward rotation, means for shifting said pinion into a position to mesh with said gear for the forward stroke thereof, a cam device for shifting said pinion out of mesh with said gear for the return stroke of said gear, and key-actuated means for operating said cam device.

30. In a calculating-machine, the combination of a laterally-shiftable master-pinion normally rotating in one direction to set up the digits; a toothed gear rotating forward and back and actuating said pinion; means for rotating said gear forward and back; a space on said gear for receiving said pinion to be thereby out of mesh therewith on the return stroke of said gear; a lost-motion space on said gear for non-interference with said pinion while the same is being shifted back into its normal position; and means for shifting said master-pinion.

31. In a calculating-machine, the combination of a master-pinion shiftable into and out of mesh with its driving-gear; a shiftable arbor carrying said pinion; means for shifting said arbor to bring said pinion into mesh with its driving-gear; a pivoted cam acting on said arbor to bring said pinion out of mesh with its driving-gear; key-actuated levers; and connections between said cam and said levers for operating said cam.

32. In combination, digit-levers, means for actuating the same, digit-sectors actuated by said levers, a universal gear actuated by said sectors, a master-pinion for setting up the digits, a cam connected with said gear for throwing said pinion into position to mesh with said gear, and a second revoluble cam for throwing said pinion out of mesh with said gear, said cam being actuated by said digit-levers.

33. In a calculating-machine, a reversing mechanism comprising a train of gears for setting up the digits, said gears rotating about fixed parallel axes and a pair of said gears being always in mesh with each other and laterally shiftable together into either of two positions, both of the gears of said pair serving to set up the digits when said pair is in one shifted position, and one only of the gears of said pair serving to set up the digits when said pair is in the other shifted position.

34. In a calculating-machine, the combination of a setting-wheel for setting up the digits, digit-sectors, means for operating the same, a universal gear operated by said sectors, connections between said universal gear and said setting-wheel, a locking-lever operating upon said setting-wheel; a cam connected to said universal gear for throwing said locking-lever into engagement with said setting-wheel, and means for throwing said lever out of engagement therewith.

35. In a calculating-machine, the combination of a setting-wheel for setting up the digits, a key-operated gear for operating the same, said gear rotating forward and back and being connected with said setting-wheel to drive the same in one direction, and said gear being disconnected from said setting-wheel to be inoperative thereon during the backward rotation of said gear; a locking-lever for locking said setting-wheel while disconnected from said gear, a rock-shaft for operating said lever, and means for operating said rock-shaft.

36. In a calculating-machine, the combination of a setting-wheel for setting up the digits; a shiftable pinion for operating said setting-wheel; a gear rotating forward and back for operating said pinion; means for shifting said pinion into connection with said gear for the forward stroke thereof; means for shifting said pinion out of connection with said gear for the return stroke thereof; a locking-lever for locking said setting-wheel; means for throwing said lever out of engagement with said setting-wheel during the forward rotation of said gear; means for throwing said lever into engagement with said setting-wheel at the completion of the forward rotation of said gear.

37. In a calculating-machine, the combination of a setting-wheel for setting up the digits, a key-operated gear for operating the same, said gear rotating forward and back; disconnectible connections between said gear and said setting-wheel, whereby said wheel is rotated forward during the forward rotation of said gear, and is still during the backward rotation of said gear; a locking-lever for engaging said wheel, a rock-shaft operating said lever, and means for operating said rock-shaft to throw said lever into engagement with said setting-wheel when said setting-wheel and said gear are disconnected.

38. In a calculating-machine, the combination of a setting-wheel rotating in one direction only in setting up the digits of any given number; a locking-lever for controllably detaining said setting-wheel, a gear rotating forward and back for operating said setting-wheel, said gear and setting-wheel being disconnected during the return stroke of said gear; a cam for throwing said lever into engagement with the setting-wheel during the first part of the return stroke of said gear, and a second cam for retaining said lever in engagement with the setting-wheel during the last part of the return stroke of said gear.

39. In a calculating-machine, the combination of a setting-wheel rotating in one direction only in setting up the digits of any given number; a locking-lever for controllably detaining said setting-wheel, a gear rotating forward and back for operating said setting-wheel, said gear and setting-wheel being disconnected during the return stroke of said gear; a cam for throwing said lever into engagement with the setting-wheel at the end of the forward stroke thereof, and a second cam operated by said gear for retaining said lever in engagement with setting-wheel until the next succeeding rotation of said setting-wheel.

40. In combination, the setting-wheel, the universal gear, the master-pinion shiftable into and out of mesh with said universal gear; said pinion driving said setting-wheel; the unmeshing cam for disconnecting said pinion from said universal gear; the locking-lever acting on the setting-wheel; the locking-cam timed to throw the locking-lever into engagement with the setting-wheel at the end of the forward stroke of the universal gear; and the retaining-cam timed to act at the commencement of the inshifting of said pinion, and to release said lever at the commencement of the next succeeding rotation of said setting-wheel.

41. In a calculating-machine, the combination of a setting-wheel, for setting up the digits, figure-pieces connecting with said setting-wheel *seriatim*, and means for straightening or alining said figure-pieces after the connection thereof with said setting-wheel, said means releasing said figure-pieces prior to the connecting of said setting-wheel with the next succeeding figure-piece.

42. In a calculating-machine, the combination of a setting-wheel, figure-pieces connecting with said setting-wheel *seriatim* and a pin for straightening or alining said figure-pieces after the connection thereof with said setting-wheel, said pin releasing any figure-piece prior to the connection of said setting-wheel with the next succeeding figure-piece.

43. In a calculating-machine, the combination of a laterally-fixed setting-wheel, shiftable pieces connecting with said setting-wheel *seriatim*, a fixed bar, and a pin on said bar for acting upon said figure-pieces subsequent to their connection with said setting-wheel and prior to the connection of said setting-wheel with the next succeeding figure-piece.

44. In a calculating-machine, the combination of a laterally-fixed setting-wheel, means for operating the same, a laterally-shiftable receiving mechanism parts whereof engage said setting-wheel *seriatim*, and an interrupted locking-bar for locking the parts of said receiving mechanism prior to their engagement with said setting-wheel, said locking-bar also engaging parts of said receiving mechanism after the same have passed said setting-wheel but prior to the engagement of said setting-wheel with the next succeeding part of said receiving mechanism.

45. A laterally-fixed setting-wheel, means for operating the same, and laterally-shiftable receiving mechanism operated by said setting-wheel, said receiving mechanism comprising carrying-wheels, carrying-pinions and rocking frames for swinging said pinions into and out of gear with said carrying-wheels; in combination with a fixed bar engaged by said rocking frames, said bar having different cross-sections at different points in its length to thereby control the position of said frames.

46. In a calculating-machine, the combination of a laterally-fixed setting-wheel, means for operating the same, a fixed bar having different cross-sections at different points in its length, laterally-shiftable carrying-wheels operated by said setting-wheel *seriatim*, carrying-pinions gearing with said carrying-wheels, and rocking frames shifting with said carrying-wheels and forming mountings for said pinions, said frames having two toes for contacting said fixed bar to thereby control the position of said frames.

47. A carrying mechanism comprising a series of carrying-wheels having carrying-teeth thereon, said carrying-teeth being operative at the end of every complete cycle of said carrying-wheels and said carrying-wheels being loosely mounted on a common shaft; and parts intermediate of said carrying-wheels, said intermediate parts connecting with said carrying-wheels at different points in the periphery of said carrying-wheels.

48. A carrying mechanism comprising carrying-pieces connected together in pairs and having carrying-teeth thereon operative at the end of each complete cycle of said carrying-pieces and said carrying-pieces being loosely mounted on a common shaft; and parts distributed non-adjacently to each other for connecting said carrying-pieces.

49. A carrying mechanism comprising a series of carrying-pieces connected in pairs and having carrying-teeth thereon operative at the end of each complete cycle of said carrying-pieces and said carrying-pieces being loosely mounted on a common shaft, and parts for connecting said carrying-pieces in pairs said last-mentioned parts being arranged in more than one group about said carrying-pieces.

50. A carrying mechanism comprising a series of composite carrying-wheels having thereon teeth formed by the overlapping of component parts of said carrying-wheels; and parts connecting said carrying-wheels said connecting parts being arranged in a plurality of groups around said carrying-wheels.

51. A carrying mechanism comprising a series of carrying-wheels having an even number of carrying-teeth thereon formed by the overlapping of two adjacent sections of said wheels; and intermediate connecting parts, said connecting parts being disposed in more than one series about said carrying-wheels.

52. In combination, figure-pieces bearing digits thereon, carrying-wheels geared thereto, said carrying-wheels having carrying-teeth formed thereon by the overlapping of two adjacent sections of said wheels; and carrying-pinions arranged in a plurality of groups so as to engage the said carrying-wheels at different points in the periphery thereof.

53. In combination, figure-pieces bearing digits thereon, carrying-wheels geared thereto, said carrying-wheels having carrying-teeth formed thereon by the overlapping of two adjacent sections of said wheels; and carrying-pinions for engaging said carrying-wheels in pairs, said pinions being arranged in a plurality of groups, each group engaging said carrying-wheels at different points in the periphery thereof.

54. In combination, figure-pieces carrying-wheels geared thereto, carrying-pinions for engaging said carrying-wheels in pairs, and a rocking frame for each of said pinions, said frames being arranged in groups at different portions of the peripheries of said carrying-wheels.

55. In combination, figure-pieces, carrying-wheels geared thereto, carrying-pinions for engaging said carrying-wheels in pairs, and two groups of rocking frames for swinging said pinions into and out of engagement with said carrying-wheels, said rocking frames being located alternately on opposite sides of said carrying-wheels.

56. The combination of a type-writer having a shiftable carriage; and a calculating attachment to said type-writer, said attachment comprising key-operated figure-pieces shiftable by said carriage, key-operated carrying mechanism operative upon said figure-pieces, said carrying mechanism comprising a series of carrying-wheels having carrying-teeth formed by the overlapping of component parts of said carrying-wheels, and parts connecting said wheels together in pairs, said wheel-connecting parts lying in groups adjacent to different portions of the peripheries of said wheels.

57. The combination of a type-writer having a shiftable carriage and a calculating attachment to said type-writer, said attachment comprising key-operated figure-pieces shiftable by said carriage, carrying-wheels operative upon said figure-pieces, carrying-pinions for engaging said carrying-wheels in pairs, rocking frames for swinging said pinions into and out of engagement with said carrying-wheels, and means fixed to the type-writer frame for operating said rocking frames.

58. In a calculating attachment to typewriters, the combination of a laterally-fixed operated setting-wheel, carrying-wheels shiftable with the type-writer carriage and engaging said setting-wheel *seriatim;* carrying-pinions movable into and out of engagement with said carrying-wheels; and means for moving said carrying-pinions into engagement with said carrying-wheels in pairs just prior to the engagement of the lower one of any pair of carrying-wheels with said setting-wheel.

59. In a calculating-machine, a shiftable carrying mechanism comprising key-operated carrying-wheels, carrying-pinions, and rocking frames for swinging said pinions into and out of connection with said carrying-wheels; in combination with a fixed bar engaged by said rocking frames, the cross-section of said bar at the point of contact with said frames determining the position of said frames.

60. In a calculating-machine, a shiftable carrying mechanism comprising key-operated carrying-wheels, carrying-pinions, and rocking frames for swinging said pinions into and out of mesh with said carrying-wheels; in combination with two toes on each of said rocking frames and a fixed bar for operating said toes, said bar being cylindrical in its acting portions, but cut away in parts for non-interference with such of the cam-toes as are momentarily inactive.

HYMAN ELI GOLDBERG.

Witnesses:
ARTHUR M. COX,
SADIE WOLF.